United States Patent
Nishinaka et al.

(10) Patent No.: US 10,302,264 B2
(45) Date of Patent: May 28, 2019

(54) LIGHTING DEVICE

(71) Applicant: Sharp Kabushiki Kaisha, Sakai, Osaka (JP)

(72) Inventors: Shumpei Nishinaka, Sakai (JP); Tsuyoshi Kamada, Sakai (JP); Yuhsuke Tsuda, Sakai (JP); Shun Ueki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/309,815

(22) PCT Filed: May 12, 2015

(86) PCT No.: PCT/JP2015/063589
§ 371 (c)(1),
(2) Date: Nov. 9, 2016

(87) PCT Pub. No.: WO2015/174397
PCT Pub. Date: Nov. 19, 2015

(65) Prior Publication Data
US 2017/0146207 A1  May 25, 2017

(30) Foreign Application Priority Data
May 13, 2014  (JP) ................. 2014-099597

(51) Int. Cl.
*F21S 11/00* (2006.01)
*F21V 5/02* (2006.01)
(Continued)

(52) U.S. Cl.
CPC ............ *F21S 11/007* (2013.01); *E06B 9/28* (2013.01); *F21S 11/00* (2013.01); *F21V 5/02* (2013.01);
(Continued)

(58) Field of Classification Search
CPC ........... F21S 11/007; F21S 11/00; F21V 5/02; G02B 5/04; G02B 5/021; G02B 5/0231
See application file for complete search history.

(56) References Cited

U.S. PATENT DOCUMENTS 2,705,819 A * 4/1955 Gellert .................. E06B 7/14
  52/209
4,448,187 A * 5/1984 Stulken .................. F24S 23/77
  126/628

(Continued)

FOREIGN PATENT DOCUMENTS

FR      2664645    *  1/1992
JP   2001-082057 A    3/2001
(Continued)

OTHER PUBLICATIONS

Official Communication issued in International Patent Application No. PCT/JP2015/063589, dated Aug. 4, 2015.

Primary Examiner — Christopher E Mahoney
(74) Attorney, Agent, or Firm — Keating & Bennett, LLP

(57) ABSTRACT

A lighting device (1) according to an aspect of the invention includes a lighting unit (10); and a mounting unit (11) for mounting the lighting unit (10) to a window frame (109), in which the lighting unit (10) includes a lighting sheet (12) and a frame (13) supporting a peripheral portion of the lighting sheet (12), in which the lighting sheet (12) includes a base material having optical transparency, a plurality of lighting portions having optical transparency which are provided in a first surface of the base material, and a void portion which is provided between the plurality of lighting portions, and in which a part of the side surface of the lighting portion facing the void portion serves as a reflecting surface reflecting light which is incident to the lighting portion.

17 Claims, 37 Drawing Sheets

(51) Int. Cl.
*E06B 9/28* (2006.01)
*G02B 5/02* (2006.01)
*G02B 19/00* (2006.01)

(52) U.S. Cl.
CPC ....... *G02B 5/0278* (2013.01); *G02B 19/0019* (2013.01); *G02B 19/0042* (2013.01)

(56) References Cited

U.S. PATENT DOCUMENTS

| | | | |
|---|---|---|---|
| 5,650,875 A | | 7/1997 | Kanada et al. |
| 5,802,784 A | | 9/1998 | Federmann |
| 9,797,187 B2 | * | 10/2017 | Clifford .................... E06B 9/24 |
| 2011/0043919 A1 | | 2/2011 | Ko et al. |
| 2011/0256350 A1 | * | 10/2011 | Ito .......................... G02B 5/045 |
| | | | 428/156 |
| 2011/0296795 A1 | | 12/2011 | Tsai |
| 2013/0265642 A1 | * | 10/2013 | Vasylyev ........... G02B 19/0042 |
| | | | 359/595 |
| 2015/0049387 A1 | * | 2/2015 | Kashiwagi ............ B29C 43/021 |
| | | | 359/592 |
| 2017/0045189 A1 | * | 2/2017 | Pricone .................. F21S 11/007 |
| 2017/0314752 A1 | * | 11/2017 | Yui ........................ F21S 11/007 |

FOREIGN PATENT DOCUMENTS

| | | |
|---|---|---|
| JP | 2005-351556 A | 12/2005 |
| JP | 2011-123478 A | 6/2011 |
| JP | 2011-168998 A | 9/2011 |
| JP | 2013-235860 A | 11/2013 |
| RU | 2369712 C1 | 10/2009 |

* cited by examiner

AT NORMAL TEMPERATURE

AT HIGH TEMPERATURE

| MATERIAL | ACRYLIC PLATE | PET | PC | Al (REFERENCE) |
|---|---|---|---|---|
| AVERAGE LINEAR EXPANSION COEFFICIENT ($10^{-5}$/°C) | 7 | 6.5 | 7 | 2.3 |
| LENGTH (m) AT 20°C | 1 | 1 | 1 | 1 |
| LENGTH (m) AT 80°C | 1.0042 | 1.0039 | 1.0042 | 1.00138 |

LIGHTING DEVICE

TECHNICAL FIELD

The present invention relates to a lighting device.

This application claims priority based on Japanese Patent Application No. 2014-099597, filed on May 13, 2014, the content of which is incorporated herein by reference.

BACKGROUND ART

In the related art, in a lighting sheet to be applied to a window or the like, most of the lighting sheets have a plurality of fine structure portions serving a lighting function. Most of the lighting sheets adopt a form in which the lighting sheet is directly attached to a window glass. In a case of the form in which the lighting sheet is attached to the window glass, it is difficult to construct or remove the lighting sheet. In addition, in a case where the lighting sheet is attached in a form that a side in which the fine structure portion is provided is facing the window glass, there is a problem in that the fine structure portions is buried in an adhesive, thereby the lighting function is deteriorated.

As a method for solving the problem, a method in which a lighting sheet is disposed between two protecting plates and the lighting sheet is attached to a window glass through an adhesive which is provided at least one side of the protecting plate is proposed (for example, PTL 1). According to the configuration, the fine structure portion is not buried in the adhesive for attaching the lighting sheet to the window glass.

In PTL 1, a window system including a first protecting plate and a second protecting plate including a lighting sheet is intended and the first protecting plate and the second protecting plate are fixed so that the lighting sheet is plated inward.

In addition, a structure in which a plurality of an adhesion dedicated projections is provided on a fine structure surface side of the lighting sheet and a gap between the adhesive or the window glass and the fine projection is set to a hollow by attaching the lighting sheet to the window glass through the projections is also proposed.

CITATION LIST

Patent Literature

PTL 1: Japanese Unexamined Patent Application Publication No. 2013-235860

SUMMARY OF INVENTION

Technical Problem

However, since any configuration of PTL 1 above is also a type that the lighting device is directly attached to the window glass, it is not a structure that the lighting device can be easily removed from a window (window glass). In addition, since a plurality of protecting plates which has the same area as that of the lighting sheet is required, the weight thereof increases.

An aspect of the present invention was accomplished in light of the above problems of the conventional technique. An object of the present invention is to provide a lighting device which suppresses an increase in the weight and which can be easily removed from the window (window glass).

Solution to Problem

A lighting device according to an aspect of the present invention includes a lighting unit; and a mounting unit for mounting the lighting unit on a mounting target, in which the lighting unit includes a lighting sheet and a supporting member supporting the lighting sheet in at least a portion of a peripheral portion of the lighting sheet, in which the lighting sheet includes a base material having optical transparency, a plurality of lighting portions having optical transparency which are provided in a first surface of the base material, and a void portion which is provided between the plurality of lighting portions, and in which a part of the side surface of the lighting portion facing the void portion serves as a reflecting surface reflecting light which is incident to the lighting portion.

The lighting device according to the aspect of the present invention may have a configuration in which the supporting member is formed of a frame body, and the frame body supports the lighting sheet in a form that the frame body surrounds the peripheral portion of the lighting sheet.

The lighting device according to the aspect of the present invention may have a configuration in which the frame body has a groove portion in an inner wall surface in which the lighting sheet is disposed and supports the lighting sheet by inserting the peripheral portion of the lighting sheet into the groove portion.

The lighting device according to the aspect of the present invention may have a configuration in which a gap is provided between a bottom surface of the groove portion and the lighting sheet.

The lighting device according to the aspect of the present invention may include a plurality of the lighting units and may have a configuration in which a coupling member coupling the lighting units is provided in the supporting member.

The lighting device according to the aspect of the present invention may have a configuration in which an inclined surface which is inclined to an incident direction side of light with respect to a main surface of the lighting sheet in a normal direction is provided in a part of the supporting member.

The lighting device according to the aspect of the present invention may have a configuration in which a light transmitting portion is provided in a part of the supporting member.

The lighting device according to the aspect of the present invention may have a configuration in which a rotation mechanism which rotates the lighting unit around a rotating shaft which is parallel to a main surface of the lighting sheet is included.

The lighting device according to the aspect of the present invention may have a configuration in which the mounting unit includes a plurality of mounting units which are arranged in one direction, and the rotation mechanism rotates the lighting unit around the rotating shaft extending in a direction parallel to an arrangement direction of the plurality of mounting units.

The lighting device according to the aspect of the present invention may have a configuration in which the mounting unit includes a plurality of mounting units which are arranged in one direction, at least one mounting unit among the plurality of mounting units is detachable from the lighting unit, and the rotation mechanism rotates the lighting unit around the rotating shaft extending in a direction parallel to an arrangement direction of the plurality of mounting units.

The lighting device according to the aspect of the present invention may have a configuration in which an elastic body is provided in at least a part of the supporting member.

The lighting device according to the aspect of the present invention may have a configuration in which the supporting member is expandable in a direction along an outer periphery of the lighting sheet.

The lighting device according to the aspect of the present invention may have a configuration in which a member for managing a temperature is provided in the lighting unit.

Advantageous Effects of Invention

As described above, according to the aspect of the present invention, it is possible to provide a lighting device which brings outdoor natural light (solar light) indoors with good efficiency, can cause a person indoors to sense brightly the indoor without glare, and can be easily removed from the mounting target.

DESCRIPTION OF EMBODIMENTS

Figure 1:
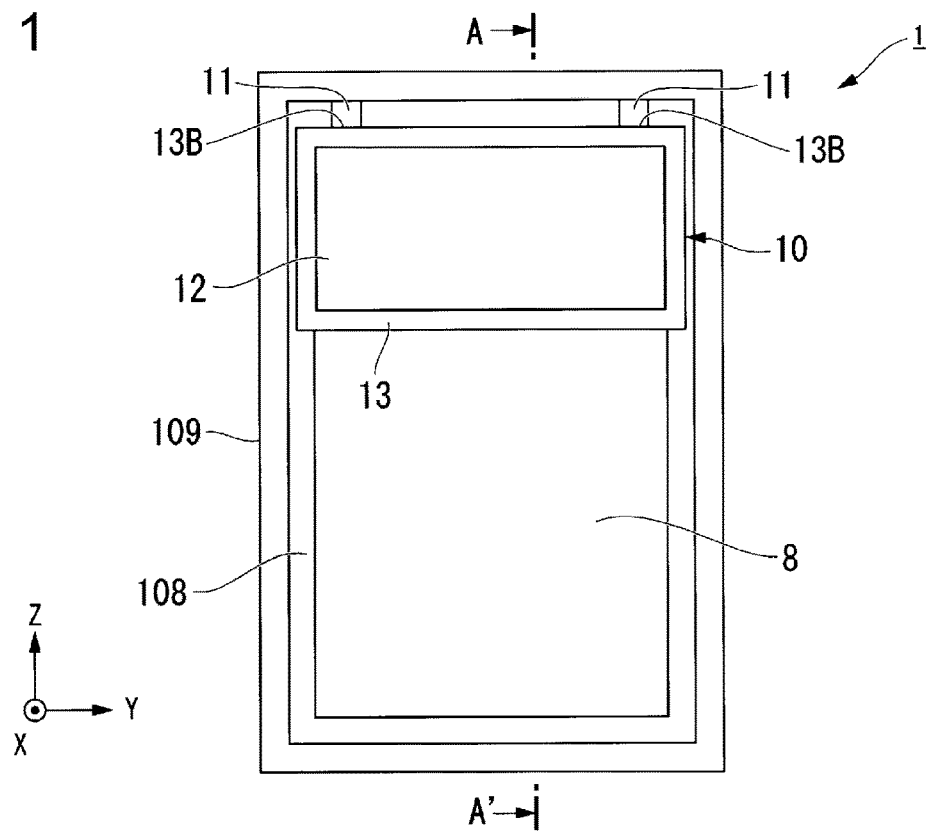
FIG. 1 is a front view illustrating an appearance of a lighting device in a form in which the lighting device is disposed in a window.

Hereinafter, an embodiment of the present invention will be described with reference made to the drawings.

Note that in the drawings the scale of each component has been suitably altered in order to make each component a recognizable size.

[First Embodiment]

First, as a first embodiment of the present invention, a lighting device 1 illustrated in FIG. 1 will be described.

Figure 2:
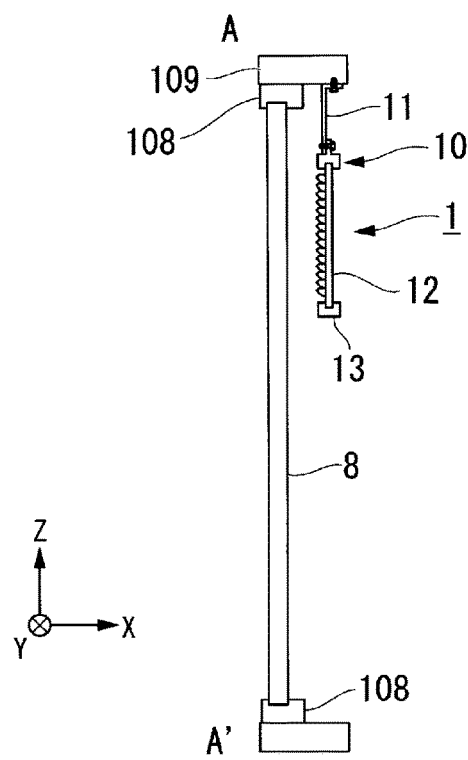
FIG. 2 is a cross-sectional view along a line A-A' of FIG. 1.
Figure 3A:
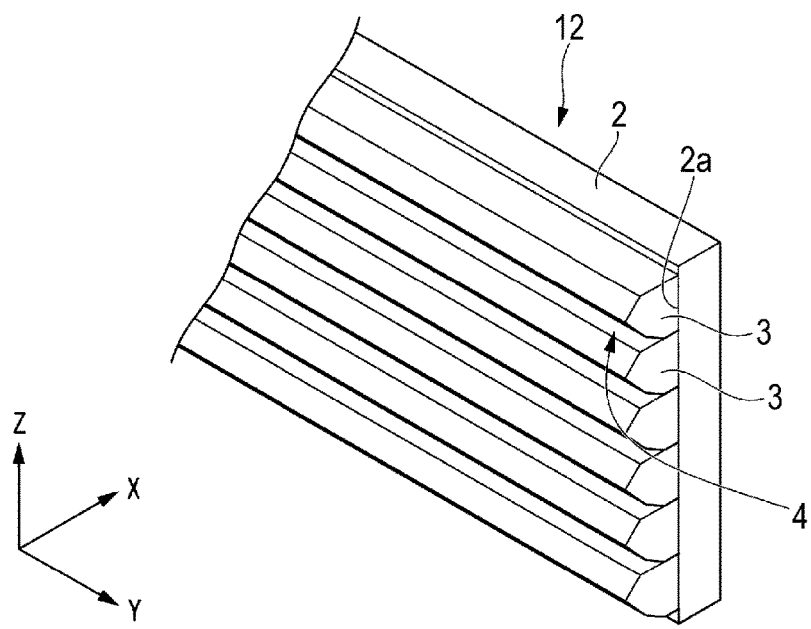
FIG. 3A is a perspective view illustrating a configuration of a lighting sheet.
Figure 3B:
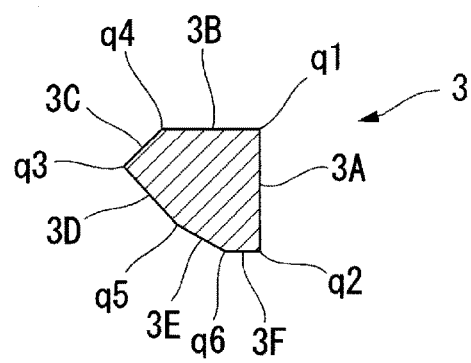
FIG. 3B is a diagram illustrating a cross-sectional shape of a lighting portion.
Figure 4:
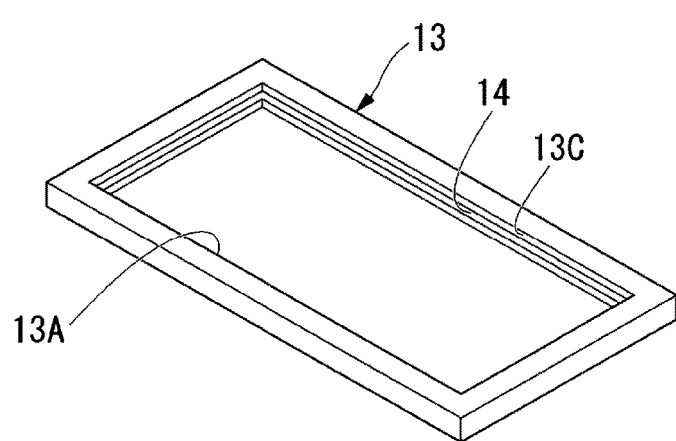
FIG. 4 is a perspective view illustrating a configuration of a frame.
Figure 5:
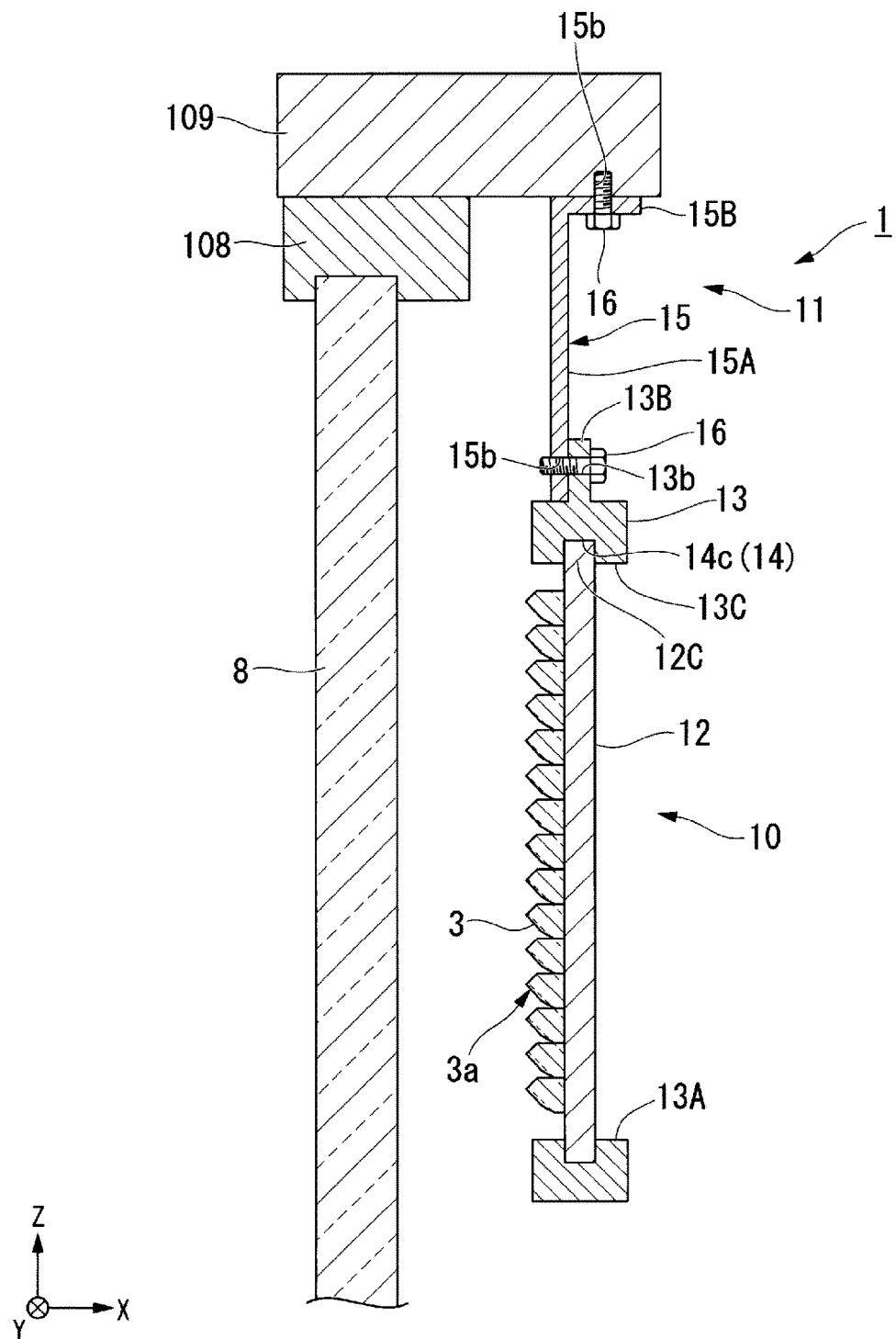
FIG. 5 is a cross-sectional view illustrating a configuration of a lighting unit.

FIG. 1 is a front view illustrating an appearance of a lighting device in a form in which the lighting device is disposed in a window. FIG. 2 is a cross-sectional view along a line A-A' of FIG. 1. FIG. 3A is a perspective view illustrating a configuration of a lighting sheet and FIG. 3B is a diagram illustrating a cross-sectional shape of a lighting portion. FIG. 4 is a perspective view illustrating a configuration of a frame. FIG. 5 is a cross-sectional view illustrating a configuration of a lighting unit.

As illustrated in FIGS. 1 and 2, the lighting device 1 is configured with a lighting unit 10 and a pair of mounting units 11 and 11.

The lighting unit 10 includes a lighting sheet 12 and a frame (supporting member) 13 supporting the lighting sheet 12.

As illustrated in FIG. 3A, the lighting sheet 12 includes a base material 2 having optical transparency, a plurality of lighting portions 3 having optical transparency which is provided in a first surface 2a of the base material 2, and a void portion 4 which is provided between the plurality of lighting portions 3.

The base material 2 is formed of a thermoplastic polymer or a light permeable resin such as a thermosetting resin, a photopolymerizable resin, or the like. In addition, as the light permeable resin, acrylic polymers, olefin polymers, vinyl polymers, cellulose polymers, amide-based polymer, fluorine-based polymer, urethane polymer, silicone polymer, an imide-based polymer, or the like can be used. Among these, for example, a polymethyl methacrylate resin (PMMA), triacetyl cellulose (TAC), polyethylene terephthalate (PET), cycloolefin polymer (COP), polycarbonate (PC), polyethylene naphthalate (PEN), polyethersulfone (PES), polyimide (PI), or the like can be suitably used. The total light transmittance of the base material 2 is preferably 90% or more under the provisions of JIS K7361-1. Therefore, sufficient transparency can be obtained.

For example, the lighting portion 3 is configured of an organic material having a light transparency and a photosensitivity such as an acrylic resin or an epoxy resin, a silicone resin, or the like. In addition, in these organic materials, a material which is obtained by mixing a polymerization initiator or a coupling agent, a monomer, an organic solvent, or the like can be used. Furthermore, the polymerization initiator may include various addition components such as a stabilizer, an inhibitor, a plasticizer, an optical brightener, a mold release agent, a chain transfer agent, other photopolymerizable monomers, or the like. In addition, materials disclosed in Japanese Patent No. 4129991 can be used. The total light transmittance of the lighting portion 3 is preferably 90% or more under the provisions of JIS K7361-1. Therefore, sufficient transparency can be obtained.

As illustrated in FIG. 3A, a plurality of lighting portions 3 extends to a longitudinal direction (length direction) of the base material 2 and is provided in an array in a short-hand direction (width direction) of the base material 2. In addition, as illustrated in FIG. 3B, regarding each of the lighting portions 3, the cross-sectional shape configures a prism body having a polygonal shape. The lighting portion 3 has, for example, six apexes (q1 to q6) in the cross-sectional shape perpendicular to the longitudinal direction and has a hexagonal shape in which all the inner angle is less than 180°. Among surfaces 3A to 3F of the lighting portion 3, a fourth surface 3D, a fifth surface 3E, and a sixth surface 3F which are positioned lower than the plane surface perpendicular to the first surface 3A passing through the apex q3 function as a reflecting surface reflecting light beams which are incident from the second surface 3B and the third surface 3C.

Here, since an air is present a space (void portion 4) between adjacent lighting portions 3, the space becomes an interface between the air and the surface. A void portion therebetween is filled with other material with low refractive index. However, a difference between the refractive indexes of the interfaces of the inner portion and the external portion of the lighting portion 3 becomes a maximum value in a case where the air is present in the external portion than a case where a material with row refractive index is present in the external portion.

It is preferable that the refractive index of the base material 2 is the same as the refractive index of the lighting portion 3. The reason is that, for example, in a case where the refractive index of the base material 2 is largely different from the refractive index of the lighting portion 3, when the light is incident from the lighting portion 3 to the base material 2, unnecessary refraction or reflection is generated in an interface between the lighting portion 3 and the base material 2. In this case, there is a possibility that the problems are generated such as desired lighting characteristics cannot be obtained and the brightness is deteriorated.

As a manufacturing method of the lighting sheet 12, for example, a plurality of lighting portions 3 can be formed on the base material 2 by using a photolithography. In addition, in addition to the method using the photolithography, the lighting sheet 12 can be manufactured by a method such as a melt extrusion method or a molding extrusion method, and an imprinting method. In the method such as the melt extrusion method or the molding extrusion method, the base material 2 and the plurality of lighting portions 3 are integrally formed by the same resins.

As illustrated in FIGS. 4 and 5, the frame 13 is formed of an aluminum frame body and supports the lighting sheet 12 in a flat state by surrounding the periphery of the lighting sheet 12. By inserting a peripheral portion 12C of the lighting sheet 12 into a groove portion 14 which is formed on an inner wall surface 13C of the frame 13, the lighting sheet 12 has a configuration in which the lighting sheet 12 is stored in the frame 13. An opening portion 13A of the frame 13 is formed by an opening area smaller than an area in a plan view of the lighting sheet 12. Therefore, overall the peripheral portion 12C of the lighting sheet 12 can be reliably held in a state where overall the peripheral portion 12C is inserted into the groove portion 14 of the frame 13.

The lighting unit 10 having such a configuration is disposed in a state where the lighting unit 10 is hanging from the upper portion of the window by the mounting unit 11. In FIGS. 1 and 2, reference numerical 8 represents a window glass, reference numerical 108 represents a window sash, and reference numerical 109 represents a window frame.

As illustrated in FIG. 5, each of the mounting units 11 includes an attaching member 15 for attaching the lighting unit 10 to a window frame (mounting target) 109 and a plurality of mounting screws 16, respectively. The attaching member 15 is a stainless-steel member and is formed of an L-shaped member in cross section by a frame attachment portion 15A and a window frame attachment portion 15B which are coupled to each other in a vertical posture. The mounting screw 16 is crewed on a screw hole 15b which is formed in each of the frame attachment portion 15A and the window frame attachment portion 15B. Accordingly, the attaching member 15 is fixed on the frame 13 and the window frame 109. The shape of the attaching member 15 is not limited thereto.

On the other hand, in the frame 13 of the lighting unit 10 according to the present embodiment, a pair of attachment portions 13B and 13B is provided on the upper portion. In a case where the attaching member 15 is fixed to the frame 13, screw holes 13b and 13b of the attachment portions 13B and 13B which are provided on the frame 13 side and screw holes 15b and 15b on the attaching member 15 side are crewed to the mounting screw 16 at the same time.

In this manner, the lighting unit 10 is mounted on the window frame 109 through the mounting unit 11. In a state where the lighting unit 10 is mounted on the window frame 109, a fine structure surface 3a of the lighting sheet 12 is in a posture in which the fine structure surface 3a is facing a window glass 8.

The lighting unit 10 according to the present embodiment is fixed to the window frame 109 through a pair of mounting units 11. However, the number of the mounting units 11 is not limited to two. The number of the mounting units 11 can be appropriately changed in accordance with a size of the lighting unit 10 or the like.

Hereinafter, an example of a room model will be described.

Figure 6:
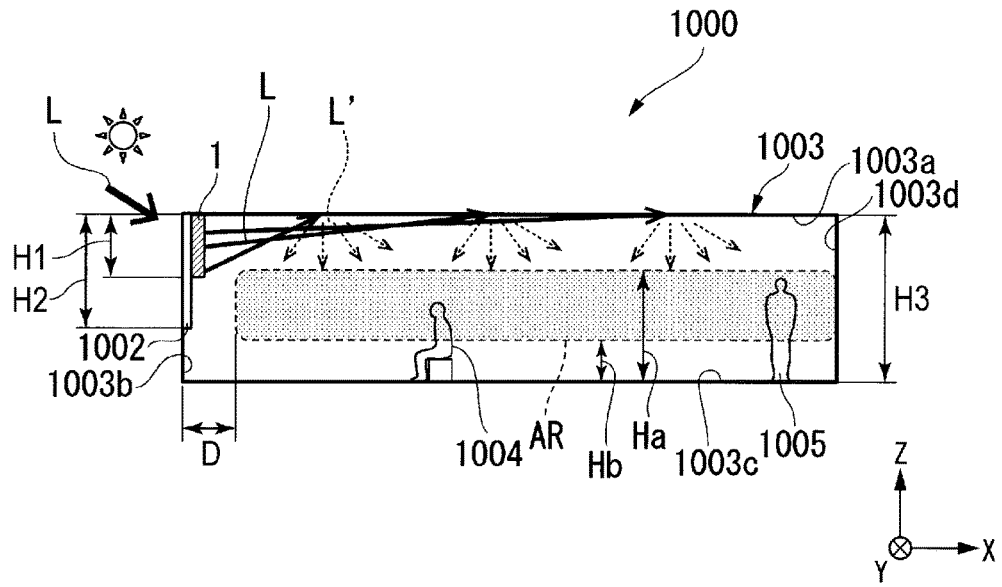
FIG. 6 is a diagram illustrating an example of a room model.

FIG. 6 is a diagram illustrating an example of a room model 1000. The room model 1000 is a model that assumes a use of the lighting device 1 in the office, for example. In FIG. 6, a window 1002 in which the lighting device 1 is disposed, a room 1003, a ceiling 1003a, a wall 1003b in a side where the solar light is incident, a floor 1003c, a wall 1003d faxing the wall 1003b, a person 1004 who is in a chair, and a person 1005 who is standing on the floor 1003c are illustrated.

The lighting device 1 is disposed on the top of the indoor side of the window 1002.

As illustrated in FIG. 6, as the room 1003, the office is included as an example and a shape of the cross-section (XZ cross-section) of the room 1003 is a rectangular shape. A height H3 of the room 1003 (a height from the floor 1003c to the ceiling 1003a) is 2.7 m, for example. A height H2 of the window 1002 is 1.8 m, for example. The lighting device 1 is provided in a portion where the human field is not blocked (a portion of 0.7 m from the ceiling 1003a, for example) in the window 1002. The height H1 of the lighting device 1 is 0.7 m, for example.

In the room model 1000, it is assumed that a person moves in a place which is away from a distance of about 1 m from the wall 1003b, for example. In a region D around the window, it is assumed that there is no person. The region D around the window is 1 m, for example, and it is assumed of a region where the person moves.

In addition, a position of the person's eyes is assumed of 0.8 m to 1.8 m from the floor 1003c, for example.

A height Ha of the eyes of the person 1005 who is standing on the floor 1003c is 1.8 m, for example. A height Hb of the eyes of the person 1004 who is in the chair is 0.8 m, for example. A range of a position of the eyes of the person is assumed based on these heights Ha and Hb of the eyes.

The lighting device 1 has a function allowing external light L to travel toward the ceiling 1003a. Light L' travelling toward the ceiling 1003a is reflected by the ceiling 1003a and is radiated indoors, and the light is used instead of the illumination. However, in the actual manner, the light L' which has passed through the lighting device 1 is not only travelling toward the ceiling 1003a but also travelling toward the wall 1003d or the floor 1003c.

In this time, in the light L' passing through the lighting device 1, light toward the position of the eyes of the person indoors is present. Such as the light, the person in the indoor senses the glare. In the room model 1000, a region where the person in the indoor senses the glare is set to a glare area AR. The range of the glare area AR is defined based on a region where the person moves and the position of the person's eyes. The glare region AR is a region of 0.8 m to 1.8 m from the floor 1003c, for example, in a place which is away from a distance of about 1 m from the wall 1003b, for example.

Figure 7:
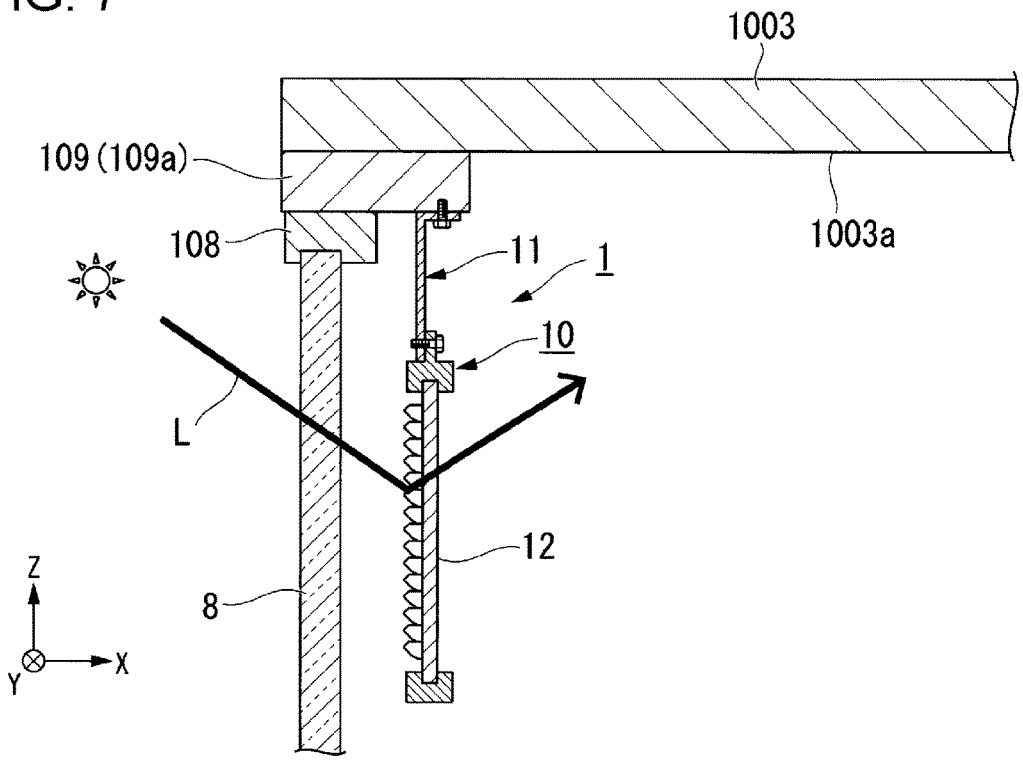
FIG. 7 is a diagram for illustrating a lighting function of the lighting device according to a first embodiment.

FIG. 7 is a diagram for illustrating a lighting function of the lighting device according to a first embodiment.

Figure 8:
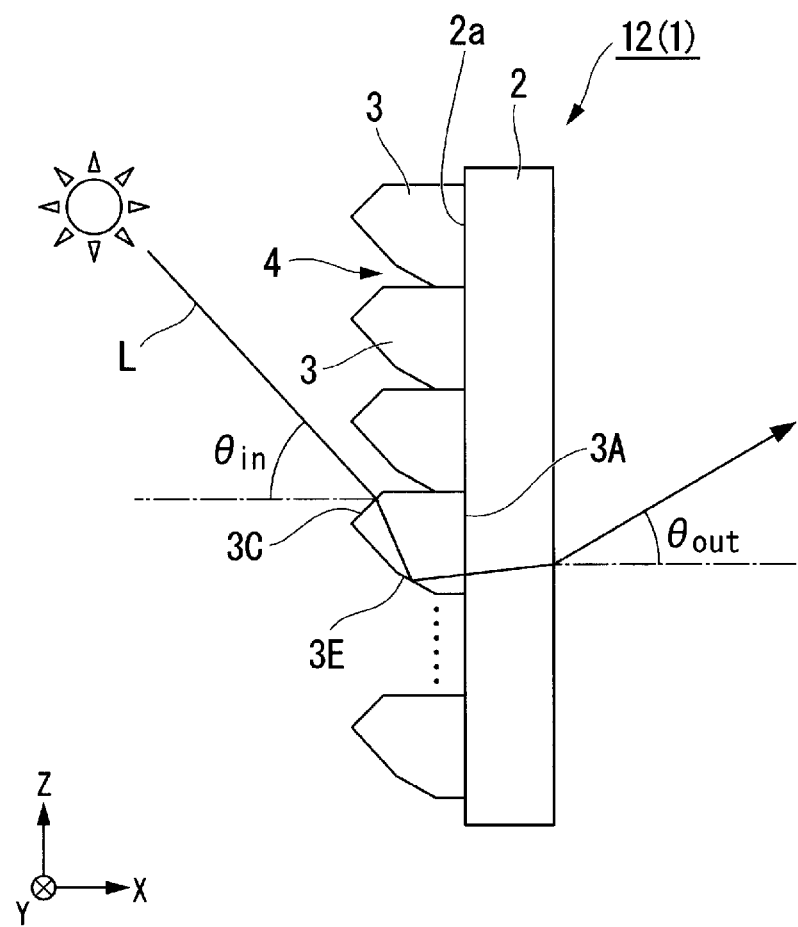
FIG. 8 is a diagram illustrating a light path of light passing through the lighting device.

FIG. 8 is a diagram illustrating a light path of light passing through the lighting device.

Since the incident light is mainly solar light, the light is mainly incident from obliquely upward of the lighting device 1. As illustrated in FIG. 7, the light L which is incident to the lighting device 1 through the window glass 8 is refracted and reflected in each of the lighting portions 3 of the lighting sheet 12 and is emitted toward obliquely upward. In particular, as illustrated in FIG. 8, the light which is incident to the lighting sheet 12 is refracted in the third surface 3C of the lighting portion 3 and is travelling to the fifth surface 3E, the light is reflected to the fifth surface 3E and is emitted from the first surface 3A side indoors, and the light is travelling toward the ceiling 1003a of the room 1003 illustrated in FIG. 7.

Therefore, as illustrated in FIG. 6, among the light beams L which are incident to the room 1003 through the window 1002, light toward the ceiling 1003a can be relatively increased while reducing the brightness of light toward the glare region AR or the brightness of light toward the floor 1003c. That is, the light L which is incident to the room 1003 through the window 1002 can be radiated toward the ceiling 1003a with good efficiency. In addition, the light L toward a ceiling 1001 can be radiated to the back of the room 1003 without the persons 1004 and 1005 in the room 1003 sense the glare.

Furthermore, the light L' reflected on the ceiling 1003a is used instead of the illumination light, and it is brightly illuminated over a wind range of the room 1003. In this case, by lighting an illumination system of the room 1003, an energy saving effect saving the daily energy to be consumed by the illumination system of the room 1003 can be expected.

FIGS. 9A to 9D are diagrams illustrating a disposing example of the lighting device 1. In the drawings, the upper diagram is a front view and the lower diagram is a top surface view.

In a method for disposing the lighting device 1 to the window 1002, there are various methods are present.

Figure 9A:
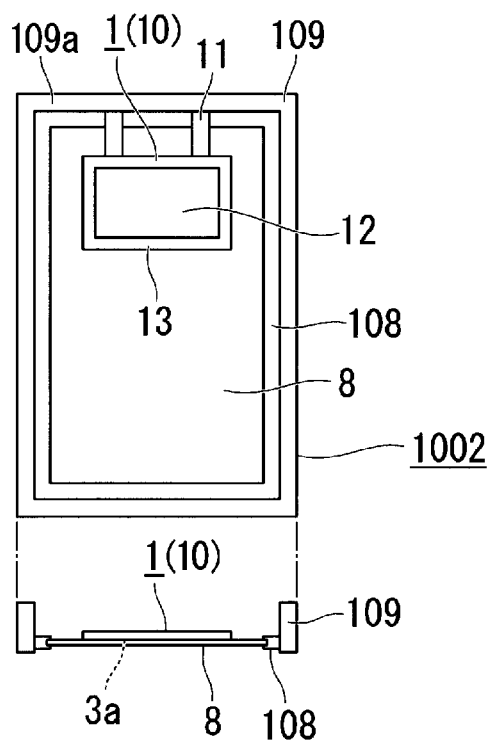
FIG. 9A is a first diagram illustrating a disposing example of the lighting device.

For example, as illustrated in FIG. 9A, the lighting device 1 may be disposed such that the entire surface of the lighting unit 10 is facing the window glass 8. In a case of the lighting unit 10 having a width dimension smaller than that of the window 1002 (window glass 8) in a horizontal direction of the room, the lighting device 1 may be attached to an upper portion 109a of the window frame 109 such that the lighting device 1 is disposed at a center in a width direction of the window 1002.

Figure 9B:
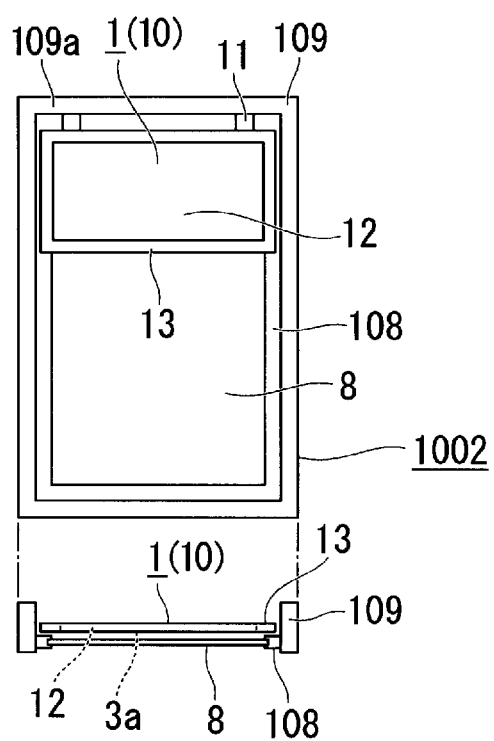
FIG. 9B is a second diagram illustrating a disposing example of the lighting device.

As illustrated in FIG. 9B, a part of the frame 13 configuring the lighting unit 10 may dispose the lighting device 1 such that a part of the frame 13 is facing a window sash 108.

Figure 9C:
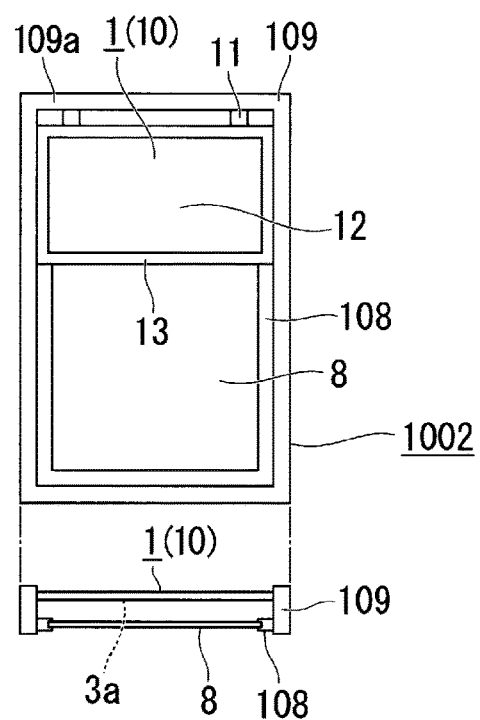
FIG. 9C is a third diagram illustrating a disposing example of the lighting device.

As illustrated in FIG. 9C, the lighting device 1 may be disposed such that the lighting device 1 is fitted to the inner side of the window frame 109. Here, the lighting device 1 is disposed at a position in a distance from the window glass 8. However, the lighting device 1 may be disposed such that the lighting device 1 is adjacent to the window sash 108.

Figure 9D:
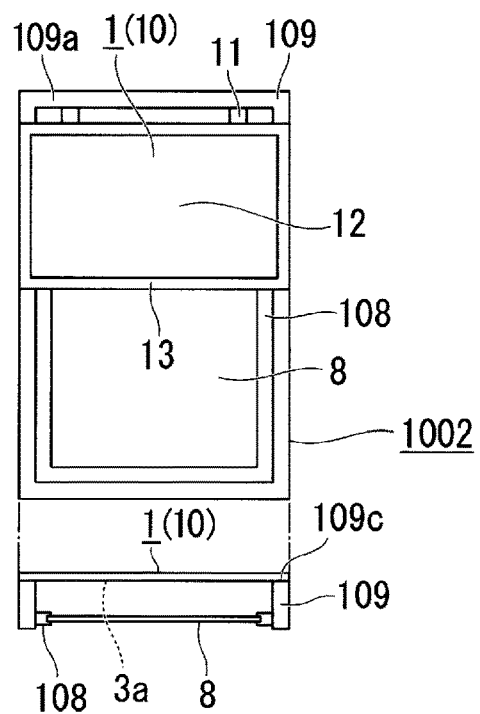
FIG. 9D is a fourth diagram illustrating a disposing example of the lighting device.

As illustrated in FIG. 9D, the lighting device 1 may be disposed such that the lighting device 1 is adjacent to the surface 109c of the indoor side of the window frame 109.

In any cases, the lighting device 1 is mounted on the window 1002 by attaching the lighting unit 10 to the window frame 109 through the mounting unit 11.

In any disposing methods, the lighting unit 10 is disposed in a posture in which the fine structure surface 3a, in which a plurality of lighting portions 3 is formed in the lighting sheet 12, is facing the window glass 8.

The lighting device 1 according to the present embodiment is configured from the mounting unit 11 and the lighting unit 10 and is assembled detachably from the window frame 109 (window 1002) in the mounting unit 11. Therefore, the lighting device 1 can be easily attached or removed to or from the window 1002, compared to the related aspect that the lighting device 1 is directly attached to the window glass 8. Accordingly, maintenance working or exchange working of the lighting unit 10 can be carried out with good efficiency.

In addition, a light weight design can be subjected, compared to the aspect in which the lighting sheet is disposed between two protecting plates. Therefore, the size of the lighting device 1 can be increased and it is possible to rapidly correspond to a request to dispose the lighting device 1 with respect to the big window.

In addition, by the mounting unit 11, the disposing position of the lighting unit 10 with respect to the window frame 109 can be freely adjusted. Therefore, by disposing the lighting unit 10 maintain a predetermined distance from the window glass 8, for example, as described in the present embodiment, the fine structure side (a side where the lighting portion 3 is formed) of the lighting sheet 12 can be in a posture in which the fine structure side is toward the window 1002. It is possible to make the fine structure side (a side where the lighting portion 3 is formed) of the lighting sheet 12 to in a posture in which the fine structure side is toward indoors.

In addition, the lighting unit 10 according to the present embodiment is configured such that the lighting sheet 12 is stored in the frame 13. By fixing the peripheral of the lighting sheet 12 by the frame 13, flatness of the lighting sheet 12 can be maintained. As a result, the good lighting function can be obtained.

[Second Embodiment]

Next, a configuration of a lighting device 20 of a second embodiment according to the present invention will be described.

Figure 10:
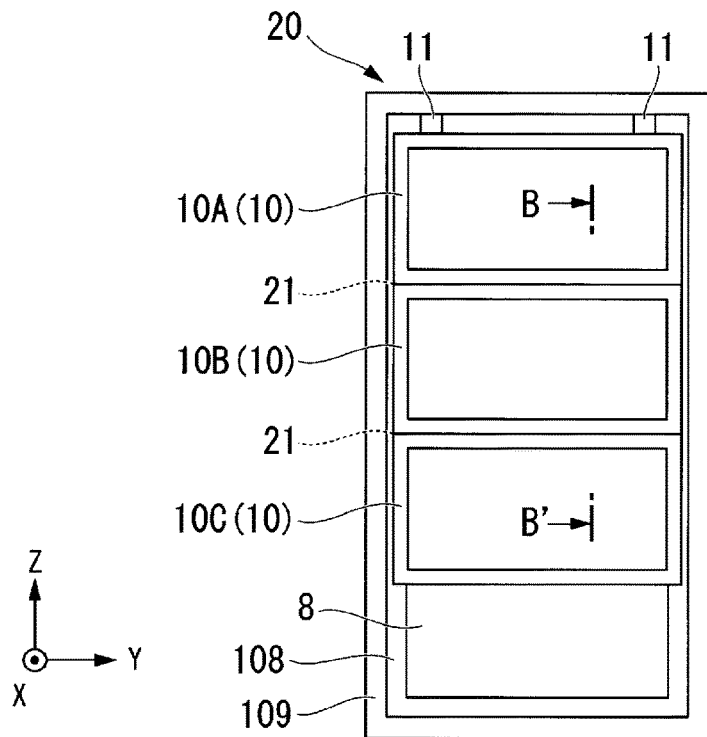
FIG. 10 is a diagram illustrating an overall configuration of a lighting device according to a second embodiment.
Figure 11:
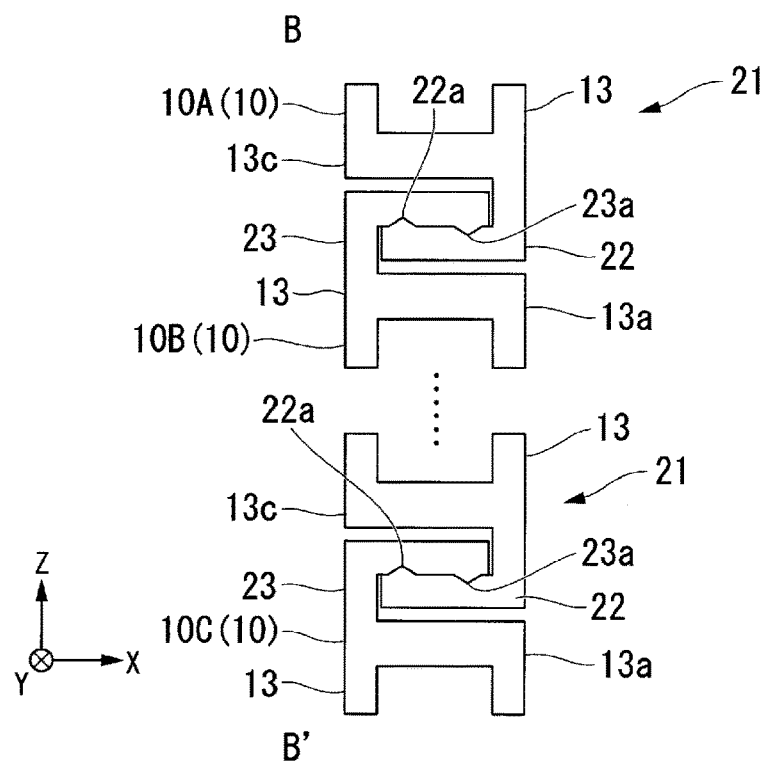
FIG. 11 is a diagram illustrating a main configuration of the lighting device according to the second embodiment and is a cross-sectional view along a line B-B' of FIG. 10.

FIG. 10 is a diagram illustrating an overall configuration of a lighting device according to the second embodiment. FIG. 11 is a diagram illustrating a main configuration of the lighting device according to the second embodiment and is a cross-sectional view along a line B-B' of FIG. 10. In a basic configuration of the lighting device 20 according to the present embodiment shown in below, the description of common portions as the first embodiment above will not be described. In addition, in each drawing to be used in the description, the same reference numerals are allocated to the common configuration elements of FIGS. 1 to 9.

As illustrated in FIG. 10, the lighting device 20 is configured by including a plurality of lighting units 10, a plurality of coupling members 21, a pair of mounting units 11. In the present embodiment, a structure in which three lighting units 10 (10A, 10B, and 10C) are coupled to each other in the vertical direction through two coupling members 21 is provided.

As illustrated in FIG. 11, the coupling member 21 is configured by a locking portion 22 which is disposed in the lighting unit 10 side which is positioned on the upper side, and a locking portion 23 disposed in the lighting unit 10 side which is positioned on the lower side, among the plurality of lighting units 10A, 10B, and 10C which are adjacent to each other in the vertical direction.

Figure 12:
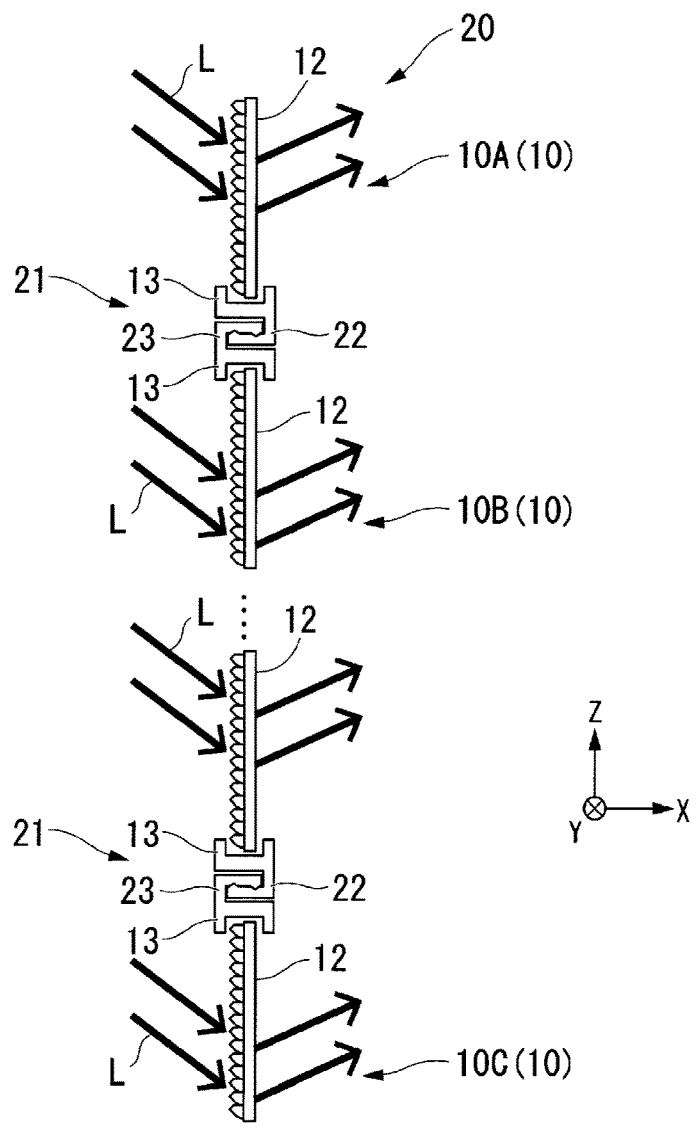
FIG. 12 is a diagram for illustrating the lighting function of the lighting device.

In particular, since the locking portion 22 maintains the L-shape in cross-sectional view which is projected to the lower side of the frame 13, the locking portion 22 extends to the entire the lower side 13c of the frame 13. On the other hand, since the locking portion 23 maintains the L-shape in cross-sectional view which is projected to the upper side of the frame 13, the locking portion 23 extends over the entire the upper side 13a of the frame 13. The locking portions 22 and 23 are locked in a state where meshing portions 22a and 23a are meshed to each other in the vertical direction. Since the coupling member 21 has the configuration in which the locking portions 22 and 23 are overlapped to each other in the lighting surface (in a YZ plane), the light L is not leaked from the coupling member 21. Thus, as illustrated in FIG. 12, only the light L which has passed through the lighting sheet 12 of each of the lighting units 10 is incident indoors.

Since the lighting device 20 according to the present embodiment has a coupling structure in which a plurality of lighting units 10 are coupled in the vertical direction, the lighting device 20 can also be easily disposed in the big window. In addition, since a plurality of lighting units 10 can be coupled to each other without the space therebetween, the light L (FIG. 12) is leaked from the space of the coupling member 21 and the person indoors does not sense uncomfortable.

The coupling member 21 according to the present embodiment is configured by the locking portions 22 and 23 extending entire the upper side 13a or the lower side 13c of the frame 13. However, it is not limited thereto. For example, the locking portions 22 and 23 may be provided in a part of the upper side 13a or the lower side 13c of the frame 13, respectively.

Figure 13:
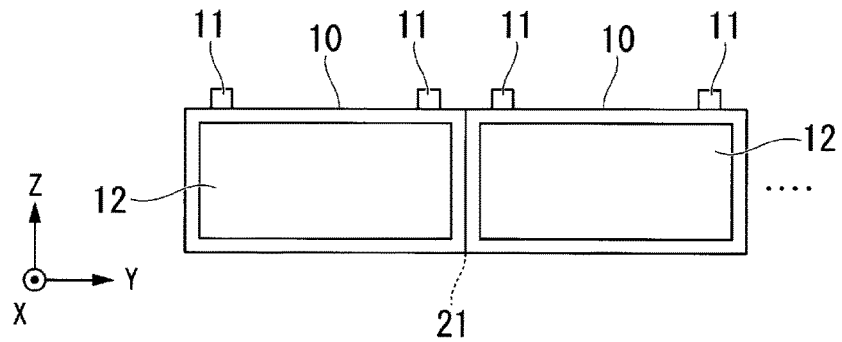
FIG. 13 is a diagram illustrating the other coupling structure.

FIG. 13 is a diagram illustrating the other coupling structure.

As illustrated in FIG. 13, a configuration in which a plurality of lighting units 10 are coupled in a horizontal direction by the coupling member 21 may be provided. Therefore, as a function of each of the coupling members 21, a function of coupling is not generated such that a space between the adjacent lighting units 10 in the horizontal direction (Y direction), is mainly used.

Therefore, the lighting device can be easily disposed in a wider window in the horizontal direction of the room.

[Third Embodiment]

Next, a configuration of a lighting device 30 of a third embodiment according to the present invention will be described.

Figure 14A:
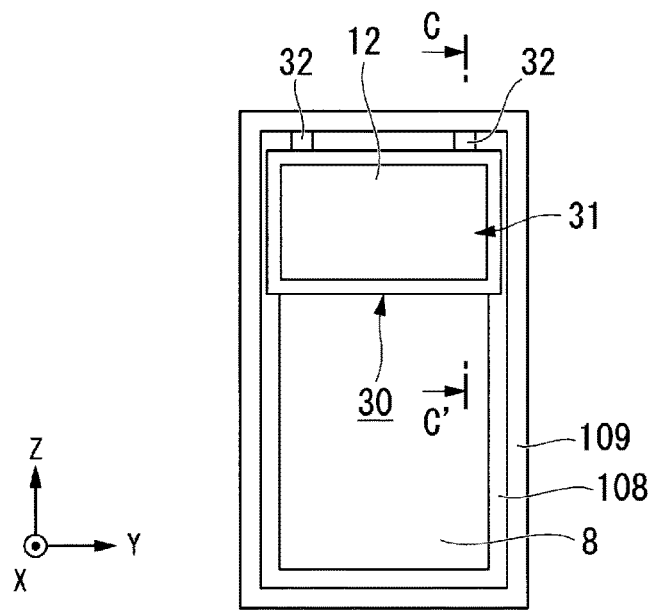
FIG. 14A is a front view illustrating a configuration of a lighting device according to a third embodiment.
Figure 14B:
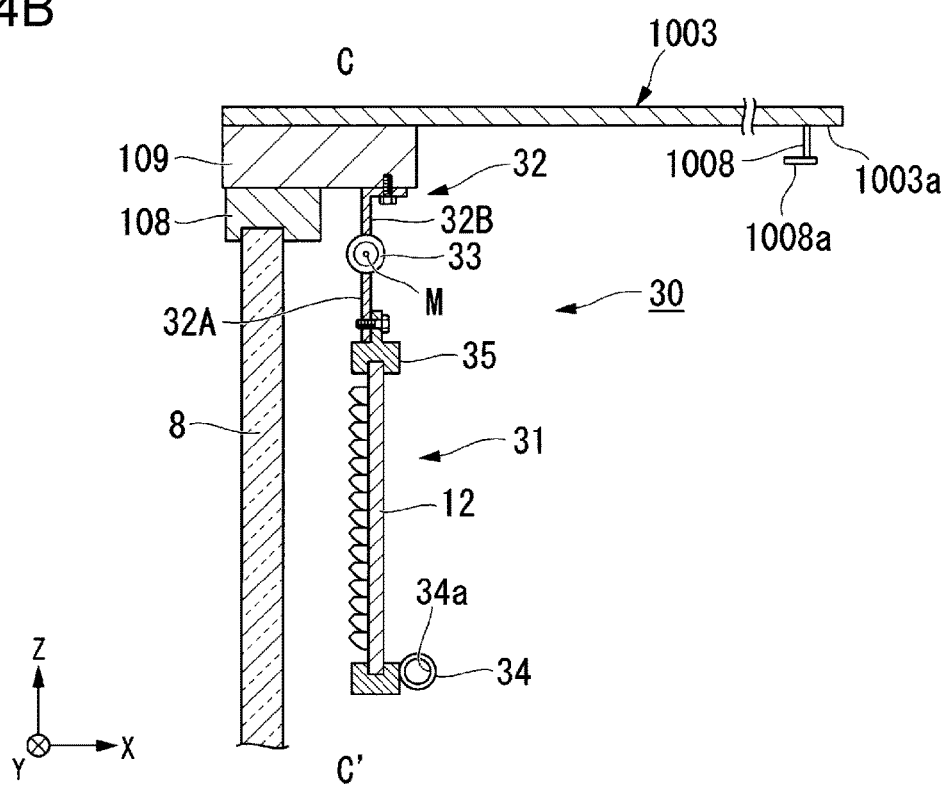
FIG. 14B is a cross-sectional view along line C-C' of FIG. 14A.

FIG. 14A is a diagram illustrating a configuration of a lighting device according to the third embodiment and FIG. 14B is a cross-sectional view along line C-C' of FIG. 14A.

Figure 15A:
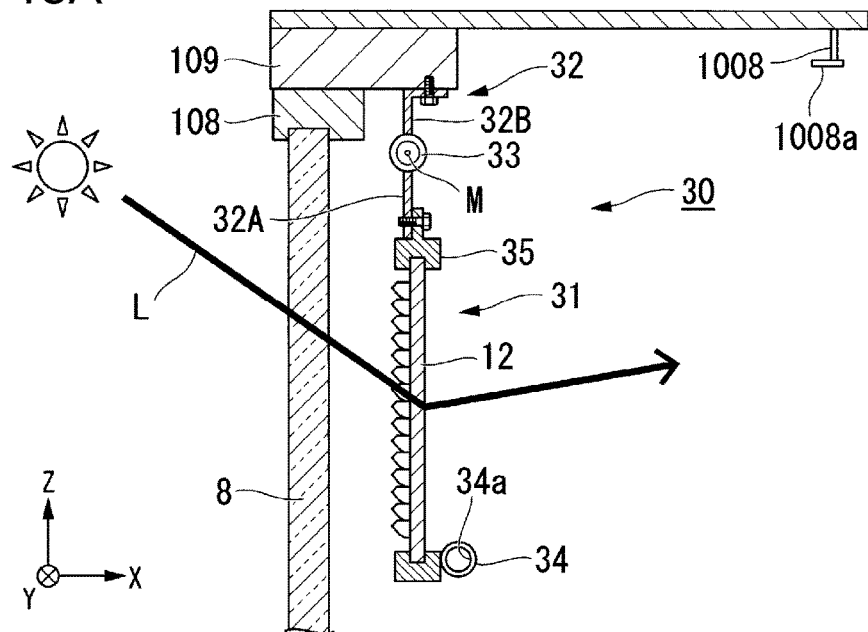
FIG. 15A is a diagram illustrating a state where the lighting device according to the third embodiment is used.
Figure 15B:
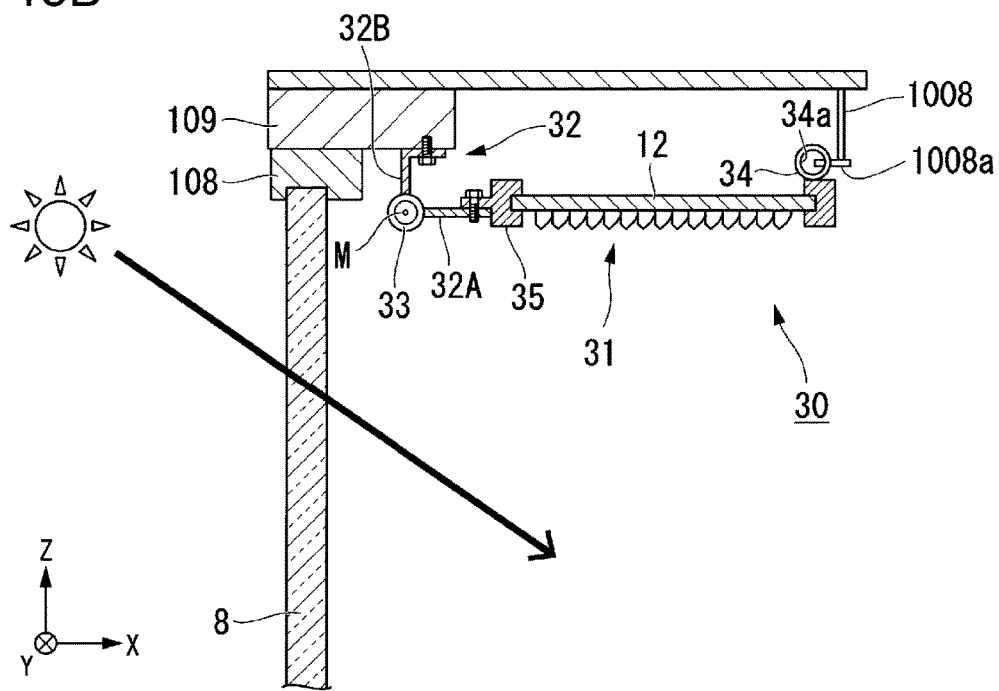
FIG. 15B is a diagram illustrating a state where the lighting device is not used (flip-up state).

FIG. 15A is a diagram illustrating a state where the lighting device according to the third embodiment is used and FIG. 15B is a diagram illustrating a state where the lighting device according to the third embodiment is not used (flip-up state).

As illustrated in FIGS. 14A and 14B, the lighting device 30 is configured by including a lighting unit 31 and a pair of mounting units 32, and as illustrated in FIGS. 15A and 15B, the lighting device 30 has a structure that the lighting unit 31 can be flipped toward upward.

The lighting unit 31 includes the lighting sheet 12 and a frame 35 maintaining the lighting sheet 12 and is fixed to the window frame 109 through the above-described mounting unit 32.

As illustrated in FIG. 14B, the mounting unit 32 according to the present embodiment includes a rotation mechanism 33 and has a structure in which a frame attachment unit 32A is tilted to a window attachment unit 32B by the rotation mechanism 33. The rotation mechanism 33 includes a rotating shaft M extending to a direction perpendicular to a sheet surface of FIG. 14B (Y direction) and rotates the frame attachment unit 32A about the rotating shaft M. That is, by rotating the lighting unit 31 (frame 35) which is attached to the frame attachment unit 32A of the mounting unit 32 around the rotating shaft M extending to a direction perpendicular to the disposing direction of the plurality of mounting units 32, the lighting unit 31 can be flipped up toward the ceiling 1003a (FIGS. 15A and 15B).

In the frame 35 according to the present embodiment, an engaging portion 34 engaging to a clip fastening 1008 which is attached to the ceiling 1003a of the room 1003 in advance is provided. The engaging portion 34 is formed into a ring shape, for example, and is locked to a tip end 1008a in a state where the tip end 1008a of the clip fastening 1008 is inserted into an annular hole 34a. Therefore, a state where the lighting unit 31 is flipped up can be maintained.

According to a lighting device 100 of the present embodiment, it is possible to select the use or not use the lighting device 30 as necessary. That is, it is possible to easily switch ON/OFF of the lighting function.

In addition, when cleaning the surface of the indoor side of the window glass 8, since the lighting device 30 is flipped up at the ceiling 1003a side, it is not required to remove the lighting device 30 for each cleaning work all the way and it can save the trouble.

[Fourth Embodiment]

Next, a configuration of a lighting device 40 of a fourth embodiment according to the present invention will be described.

Figure 16:
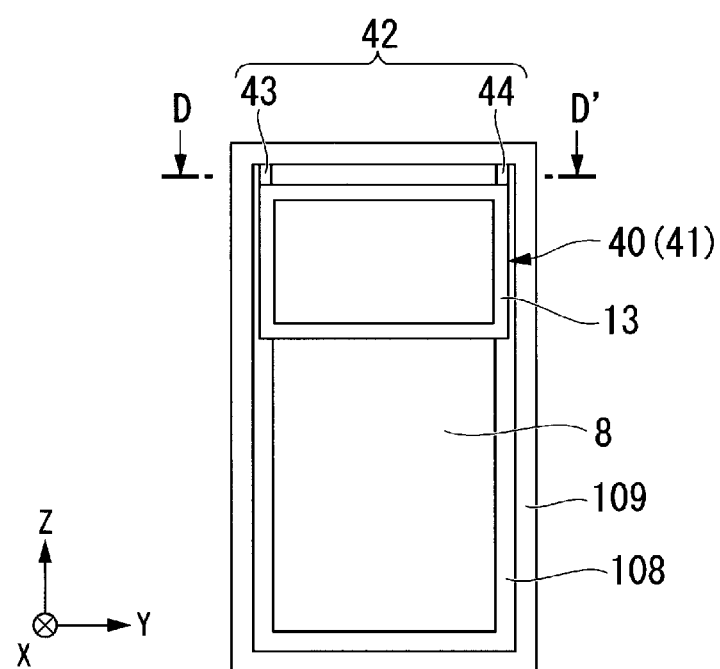
FIG. 16 is a front view illustrating a disposing state of a lighting device according to a fourth embodiment.

FIG. 16 is a front view illustrating a disposing state of a lighting device according to the fourth embodiment.

Figure 17A:
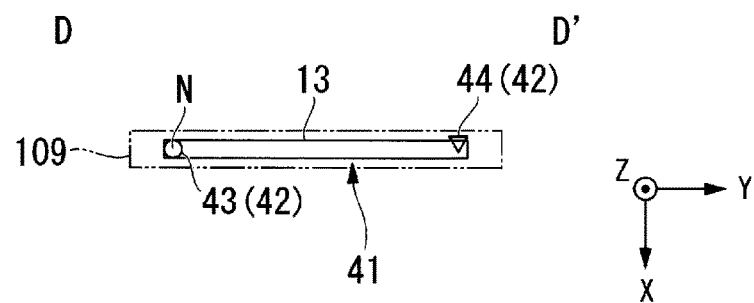
FIG. 17A is a cross-sectional view along a line D-D' of FIG. 16 and is a diagram illustrating the lighting device at a normal use.
Figure 17B:
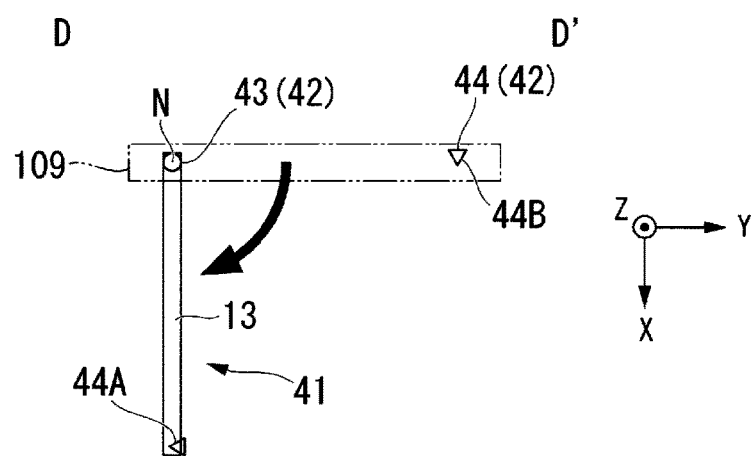
FIG. 17B is a cross-sectional view along the line D-D' of FIG. 16 and is a diagram illustrating the lighting device at a time of releasing.

FIG. 17A is a cross-sectional view along a line D-D' of FIG. 16 and is a diagram illustrating the lighting device at a normal use and FIG. 17B is a cross-sectional view along the line D-D' of FIG. 16 and is a diagram illustrating the lighting device at a time of releasing.

The lighting device 40 according to the present embodiment is configured of a lighting unit 41 and a mounting mechanism 42 including a pair of mounting units 43 and 44 and the lighting unit 41 is disposed in the window through the mounting mechanism 42. The mounting mechanism 42 of the present embodiment includes an opening and closing mechanism which is capable of opening and closing the lighting unit 41 with respect to the window and opens and closes the lighting unit 41 about one mounting unit 43 configuring the attachment mechanism 42.

As illustrated in FIGS. 17A and 17B, the mounting unit 43 includes a rotating shaft N extending to a vertical direction (Z direction) of the window and has a structure in which the mounting unit 43 rotates the lighting unit 41 about the rotating shaft N.

A mounting unit 44 is configured by including a pair of locking portions 44A and 44B, for example, and holds the lighting unit 41 by locking the locking portion 44A which is provided in the frame 13 side to the locking portion 44B which is provided in the window frame 109 side. As an example of the locking portions 44A and 44B, a pair of magnets may be adopted, for example.

In the present embodiment, since the lighting unit 41 has a configuration in which the lighting unit 41 is supported by the window frame 109 by one mounting portion 43, the load of the lighting unit 41 is not applied in the mounting unit 44 side. Accordingly, it is possible to simplify the configuration of the mounting unit 44 side. If the mounting units 43 and 44 can hold the lighting unit 41 parallel and horizontally with respect to the window glass 8, any configuration can also be employed.

According to the lighting device 40 of the present embodiment, when the cleaning working of the window glass 8 is performed, since the lighting unit 41 may be only open to the indoor side, it is possible to save the trouble of removing the lighting device 40 from the window frame 109. In addition, since the lighting unit 41 has a configuration in which the lighting unit 41 is rotated about the rotating shaft N, it is not necessary to lift the lighting unit 41 to the ceiling. Therefore, for example, even in a case of a short user, the lighting unit 41 can be easily open.

(Effect of Solar Altitude)

Figure 18:
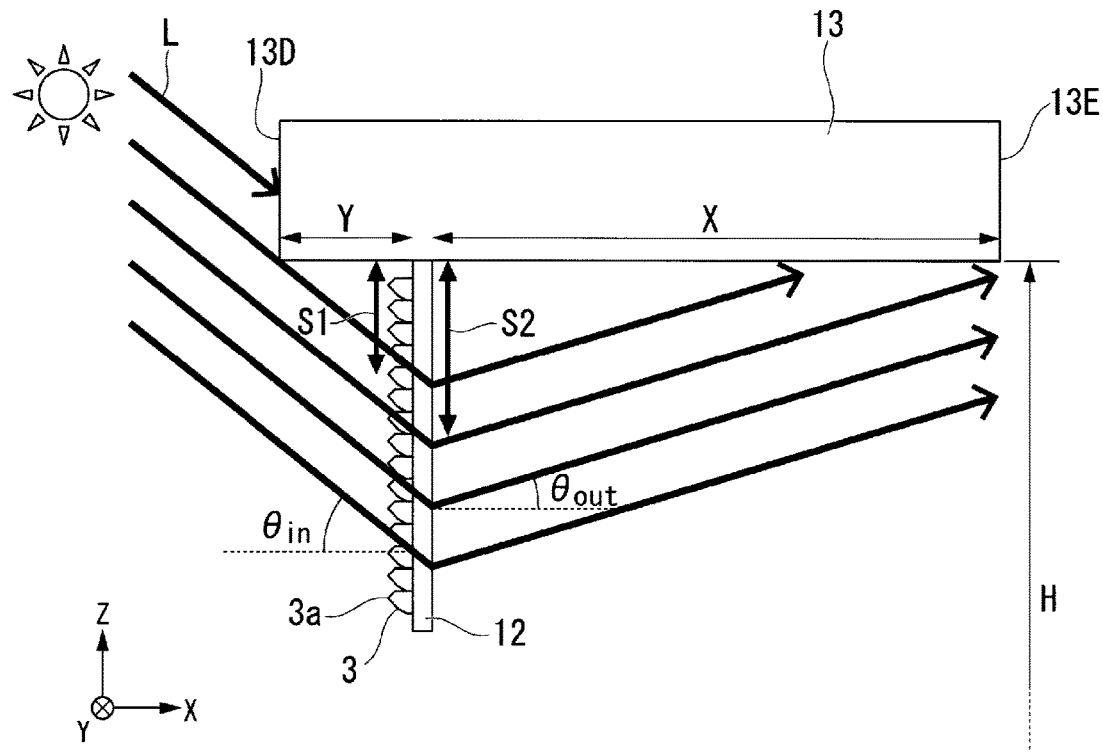
FIG. 18 is a diagram for illustrating a relationship between the thickness of the frame and an incident light amount.

Next, a feature that an amount of the light passing through the lighting unit has an effect on the solar altitude will be described. FIG. 18 is a diagram for illustrating a relationship between the thickness of the frame and an incident light amount. The amount of the light which can be collected indoors through the lighting device has a huge effect on the altitude of the solar.

That is, a change in an incident angle θin of incident light has a huge effect.

As illustrated in FIG. 18, among the solar light beams L to be incident at an incident angle of θin, a part of the light beams are shielded by the frame 13 of the lighting unit in some cases. That is, by the incident angle θin of the solar light L, a region in which the solar light is not incident to an upper portion side of the lighting sheet 12 (hereinafter, referred to as a non-incident region 51) is generated in some cases. In addition, in also the light which has passed through the lighting sheet 12 (emitting light), a part of the light is shielded by the frame 13 and a region in which the transmitting light is not incident indoors (hereinafter, referred to as a non-emitting region S2) is generated.

The non-incident region 51 and the non-emitting region S2 can be obtained by the following expressions.

Here, the disposing position of the lighting sheet 12 in the frame 13 can be expressed such that, in a thickness direction (X direction) of the frame 13, a distance from an incident side end surface 13D side of the frame 13 is defined as Y and a distance from an emission side end surface 13E side of the frame 13 is defined as X.

Non-incident region S1: $S1 = Y \times \tan(\theta in)$

Non-emission region S2: $S2 = X \times \tan(\theta out)$

When an inner dimension of an opening of the frame 13 in the vertical direction (hereinafter, referred to as a vertical width inner dimension) is defined as H. However, effective incident efficiency (%) in the lighting device and effective emission efficiency (%) can be obtained by the following expressions.

Effective incident efficiency (%) = $\{H-(S1)\}/H$

Effective emission efficiency (%) = $\{H-(S2)\}/H$

Figure 19:
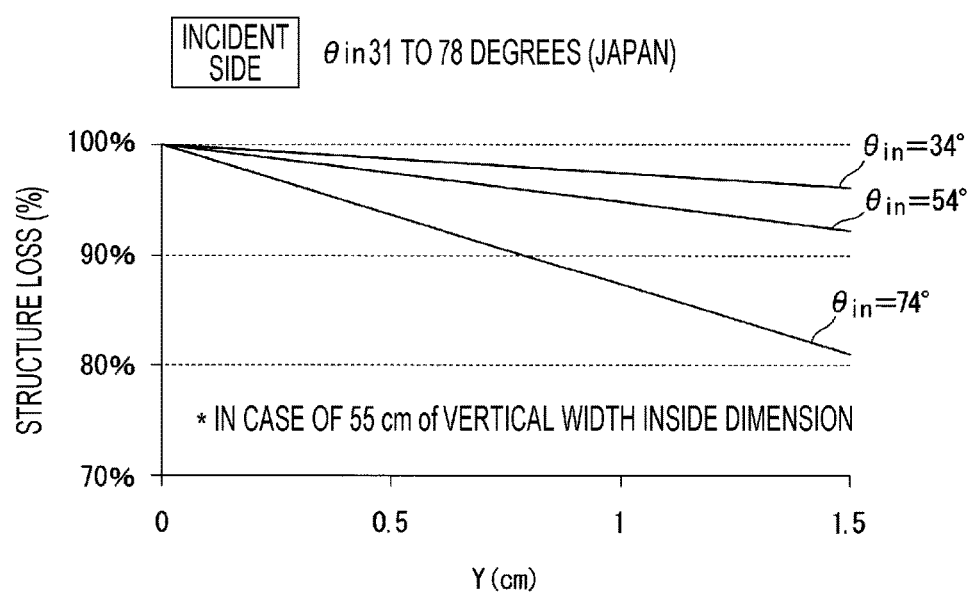
FIG. 19 is a graph illustrating a relationship between a disposing position Y (cm) of the lighting sheet in a frame when a vertical width inner dimension is set to H (cm) and effective incident efficiency (%) for each incident angle.
Figure 20:
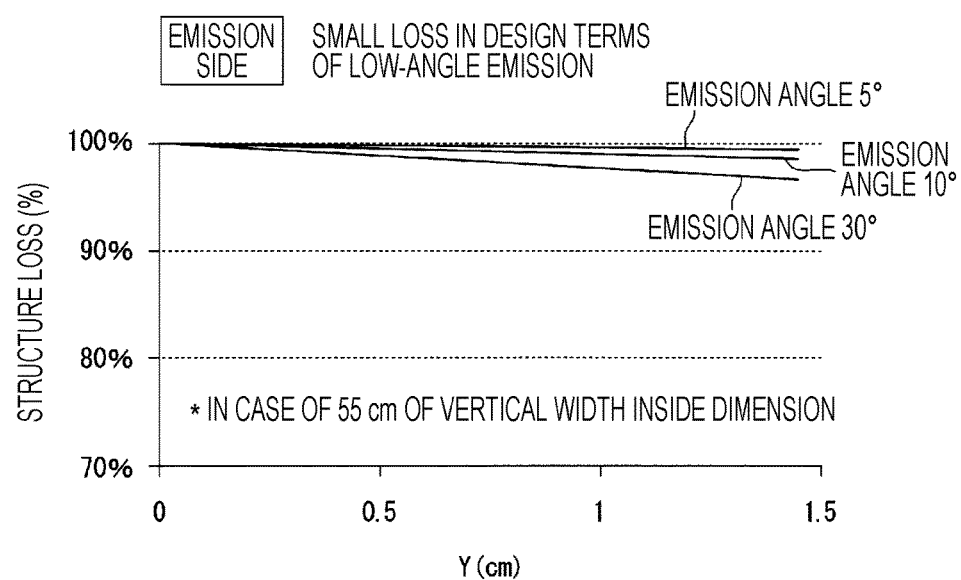
FIG. 20 is a graph illustrating a relationship between a disposing position Y (cm) of the lighting sheet in a frame when a vertical width inner dimension is set to H (cm) and effective emission efficiency (%) for each emission angle.

FIG. 19 is a graph illustrating a relationship between a disposing position Y (cm) of the lighting sheet in a frame when a vertical width inner dimension is set to H (cm) and effective incident efficiency (%) for each of incident angles and FIG. 20 is a graph illustrating a relationship between a disposing position Y (cm) of the lighting sheet in a frame when a vertical width inner dimension is set to H (cm) and effective emission efficiency (%) for each of emission angles.

In Japan, the solar altitude (incident angle θin of the incident light) is varied in the range of about 31° to 78° in one year.

As illustrated in FIG. 19, the effective incident efficiency is deteriorated and the structure loss becomes greater as the disposing position of the lighting sheet 12 is entered to the inner side of the frame 13, that is, as the length Y between the lighting sheet 12 and the incident side end surface 13D of the frame 13 becomes longer, regardless of the solar altitude (incident angle θin). Among these, in the midsummer (in a case of the incident angle θin=74°, the effective incident efficiency is greatly deteriorated and the structure loss becomes greater in compared of the midwinter (in a case of the incident angle θin=34°. It is indicated that an amount of light to be lighted by the frame 13 (the non-incident region Si in the lighting sheet 12) is increased as the solar altitude become higher.

On the other hand, in the emission side, as illustrated in FIG. 20, an effect of the disposing position of the lighting sheet 12 is small compared to the incident side. However, in a case where the emission angle θout of the light to be emitted from the lighting sheet 12 is 30°, the deterioration degree of the effective emission efficiency becomes greater compared to a case where the emission angle θout is 5° or 10°. Accordingly, it can be considered that it is affected on the disposing position of the lighting sheet 12 in a greater or lesser degree. Although, the structure loss may be much small compared to the incident side and it is considered that it is difficult to effect on the frame 13 and the solar altitude.

That is, in order to reduce the non-emitting region S2 which is generated in the emission side of the lighting sheet 12 as much as possible, it is possible to suppress the effect on the frame 13 and the effect on the solar altitude as described above in terms of design of the fine structure of the lighting sheet 12.

Regarding the non-incident region Si which is generated in the incident side of the lighting sheet 12, it is possible to improve the non-incident region S1 by disposing the lighting sheet 12 to the position as close as possible to the incident side surface 13D of the frame 13.

However, in a case of the configuration in which the fine structure is formed in the incident side of the lighting sheet 12 and the fine structure surface 3a which is configured by the plurality of lighting portions 3 is closer to the outermost surface of the product, it is easily scratched during transporting or the like.

In the following embodiment, a configuration including the improvement of the non-incident region Si and the protecting of the fine structure of the lighting sheet 12 will be described.

[Fifth Embodiment]

Next, a configuration of a lighting device 50 of a fifth embodiment according to the present invention will be described.

Figure 21A:
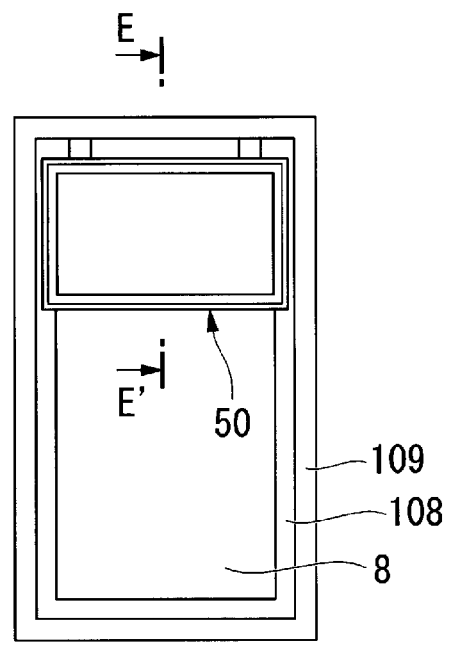
FIG. 21A is a front view illustrating a configuration of a lighting device according to a fifth embodiment.
Figure 21B:
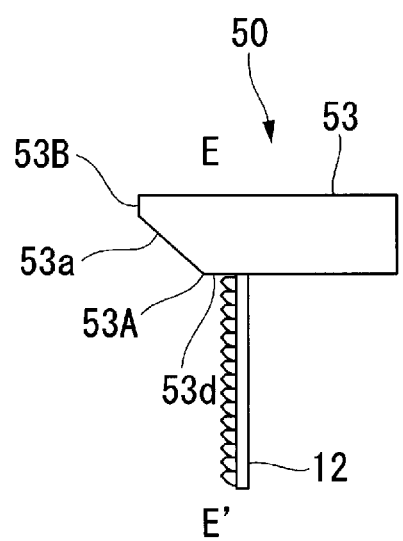
FIG. 21B is a cross-sectional view along a line E-E' of FIG. 21A.

FIG. 21A is a front view illustrating a configuration of a lighting device according to the fifth embodiment and FIG. 21B is a cross-sectional view along a line E-E' of FIG. 21A.

Figure 22:
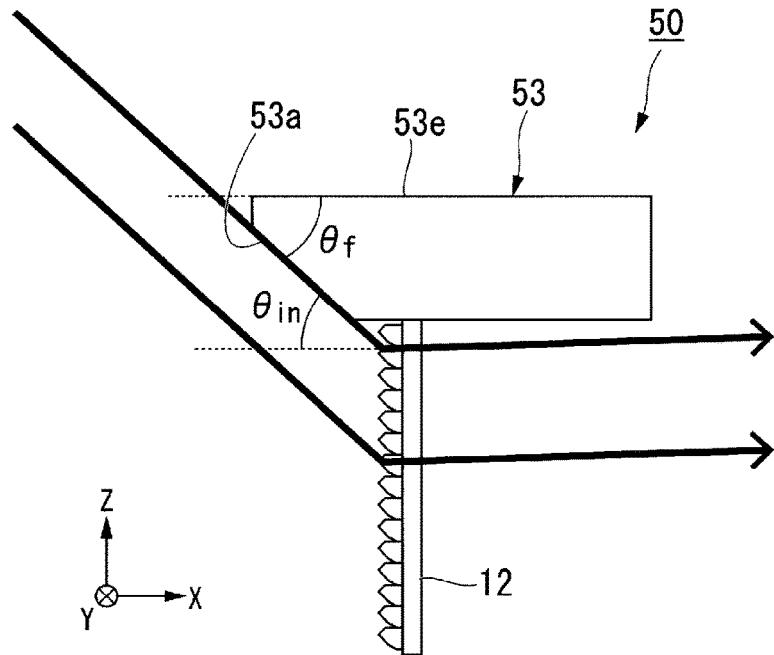
FIG. 22 is a diagram for defining an angle of an inclined surface of a frame.

FIG. 22 is a diagram for defining an angle of an inclined surface of a frame.

Figure 23:
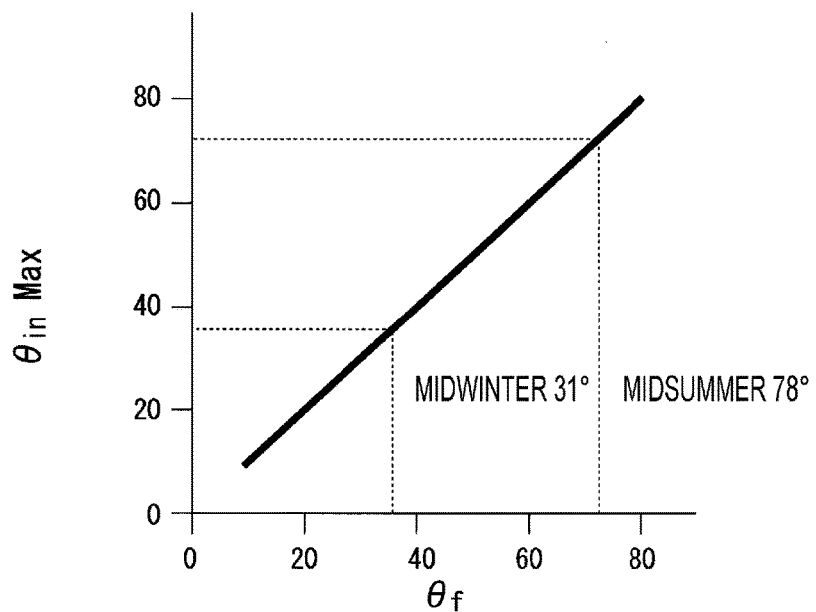
FIG. 23 is a graph illustrating a relationship between the angle of the inclined surface of the frame and a solar altitude.

FIG. 23 is a graph illustrating a relationship between the angle of the inclined surface of the frame and a solar altitude.

As illustrated in FIGS. 21A and 21B, the lighting device 50 according to the present embodiment includes a frame 53 including an inclined surface 53a in one surface side facing the window glass 8. The inclined surface 53a is formed in the tip end side of an inner peripheral 53d surrounding the periphery of the opening portion 53A and is inclined to the inner side in the thickness direction. In other words, a configuration in which the inclined surface 53a which is inclined in the incident direction side of the light is provided in a part of the frame 53 with respect to the normal direction of the fine structure surface 3a (main surface) of the lighting sheet 12 is provided.

As illustrated in FIG. 22, an angle θf formed of an outer peripheral surface 53e and the inclined surface 53a of the frame 53 is set according to an orientation of the window to be disposed or the solar altitude. When the midwinter where the solar altitude is most lowered in one year, the incident angle θin of the incident light becomes about 31° (FIG. 23) and when the midsummer where the solar altitude is most increased in one year, the incident angle θin of the incident light becomes about 78° (FIG. 23). Accordingly, the angle in which the incident angle θin becomes greater is set to the angle θf which is formed of the outer peripheral 53e and the inclined surface 53a of the frame 53 (θf=θinMax).

Here, as illustrated in FIGS. 22 and 23, when setting at least the angle θf which is formed of the outer peripheral 53e and the inclined surface 53a of the frame 53 to 30° or less, since a part of the incident light is always shielded, it is not preferable. In addition, when setting the inclination angle θf of the inclined surface 53a to 80° or more, the lighting surface of the lighting sheet 12 becomes closer to the outermost surface of the frame 53 and furthermore, closer to the outermost of the lighting device 50, and since it is scratched during transporting or the lie, it is not preferable. Accordingly, the inclination angle θf of the inclined surface 53a is set to a range of 30°≤θf≤θ80 that is an appropriate range.

According to the configuration of the present embodiment, it is possible to prevent the solar light to be incident to the lighting sheet 12 from being shielded by the frame 53. As a result, it is possible to more collect a lot of the external light beams without affecting on the solar altitude.

The end surface 53B of the frame 53 is actually bent.

[Sixth Embodiment]

Next, a lighting device 60 of a sixth embodiment according to the present invention will be described.

Figure 24A:
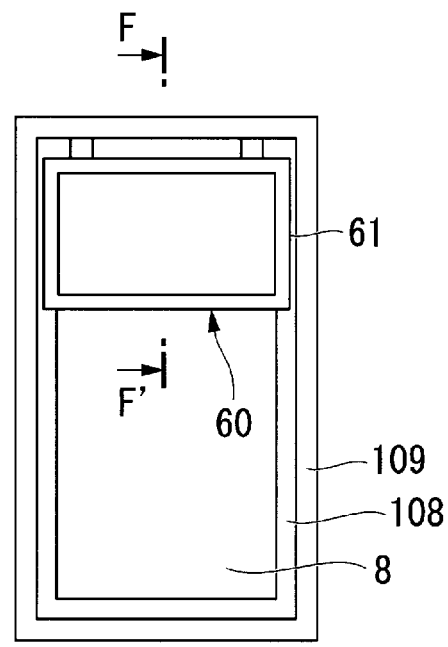
FIG. 24A is a front view illustrating a configuration of a lighting device according to a sixth embodiment.
Figure 24B:
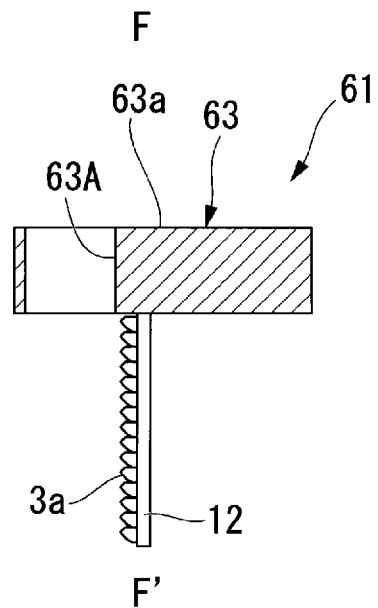
FIG. 24B is a cross-sectional view along a line F-F of FIG. 24A.

FIG. 24A is a front view illustrating a configuration of a lighting device according to the sixth embodiment and FIG. 24B is a cross-sectional view along a line F-F of FIG. 24A.

Figure 25:
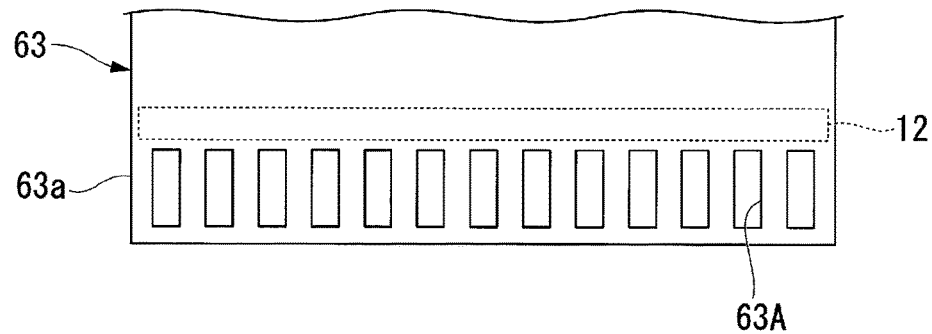
FIG. 25 is a diagram of the frame according to the sixth embodiment when viewed from the top side.

FIG. 25 is a diagram of the frame according to the sixth embodiment when viewed from the top side.

Figure 26:
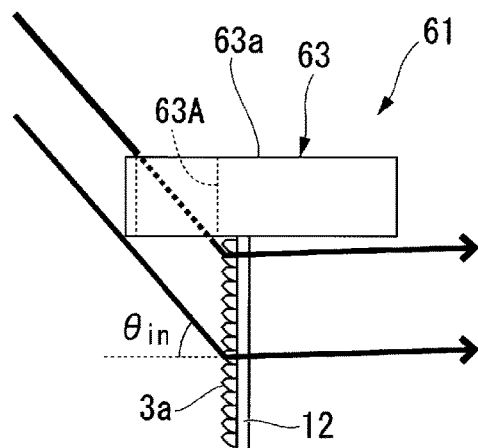
FIG. 26 is a side view of the frame according to the sixth embodiment.

FIG. 26 is a side view of the frame according to the sixth embodiment.

As illustrated in FIGS. 24A and 24B, a lighting unit 61 configuring the lighting device 60 of the present embodiment includes a frame 63 in which a plurality of opening portions (light transmitting portion) 63A are formed in the incident side. In particular, in the frame 63, the plurality of opening portions 63A are formed in the upper side portion 63a at the incident side in the predetermined distance. The opening area of each of the storage or the number of the opening portions 63A is appropriately set according to the orientation of the window or the solar altitude.

As illustrated in FIG. 25, the opening portion 63A having a rectangular shape in a plan view is formed in a state where the longitudinal direction is along the width direction (depth direction) of the frame 63. Therefore, it is possible to correspond to the changes in the incident angle θin of the incident light. That is, even when the incident angle θin of the incident light to be incident to the lighting unit 61 is changed, as illustrated in FIG. 26, it is possible to pass through a part of the incident light.

The lighting sheet 12 which is assembled in the frame 63 is disposed in a position where each of the opening portions 63A of the frame 63 is not overlapped in a plan view. It is preferable that the disposing position of the lighting sheet 12 is set closer to the opening portion 63A as much as possible in the thickness direction of the frame 63.

As described above, by the solar altitude (incident altitude θin of the incident light), a part of the incident light is shielded by the frame 63. By disposing the lighting sheet 12 to the incident end surface side of the frame 63 as much as possible, it is possible to improve the incident efficiency with respect to the lighting sheet 12. However, since the fine structure surface 3a is easily scratched, the lighting sheet 12 cannot be disposed to the incident end surface side.

Here, the lighting device 60 of the present embodiment has a configuration in which the opening portion 63A for allowing the incident light to pass therethrough is provided to the frame 63. In order to protect the lighting surface of the lighting sheet 12, even in a case of the configuration in which the lighting sheet 12 is disposed in a position entering to the inner side of the frame 63, it is possible to input the light which has passed through the opening portion 63A of the frame 63 to the lighting sheet 12. Therefore, it is possible to greatly reduce the non-incident region which is generated in the incident side of the lighting sheet 12. As a result, the area which is capable of lighting in the lighting sheet 12 is increased and more light beams can be collected indoors.

Figure 27:
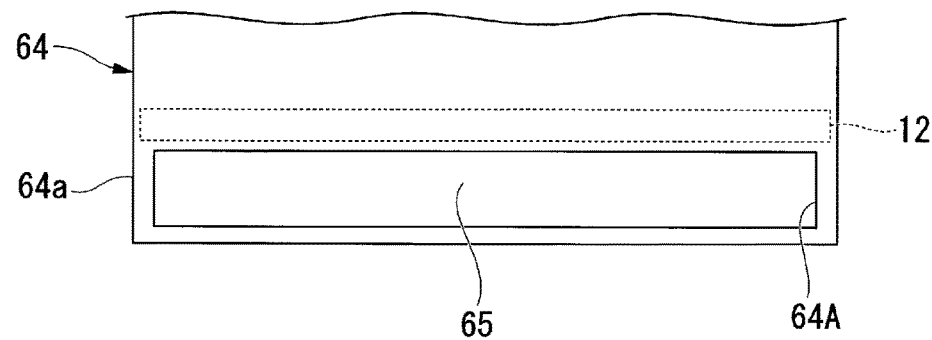
FIG. 27 is a diagram illustrating a modification example of the frame according to the sixth embodiment.

The shape of the opening portion 63A in a plan view is not limited thereto. For example, as illustrated in FIG. 27, one opening portion (light transmitting portion) 64A may be formed substantially in the longitudinal direction over the entire upper side portion 64a of a frame 64. In this case, it is preferable that a transparent member 65 is disposed in the opening portion 64A. An example of the transparent member 65 includes an acryl plate, a glass plate, a polycarbonate plate, or the like. In also the above-described frame 63, the transparent member 65 may be disposed in each of the opening portions 63A.

[Seventh Embodiment]

Next, a lighting device 70 of a seventh embodiment according to the present invention will be described.

Figure 28A:
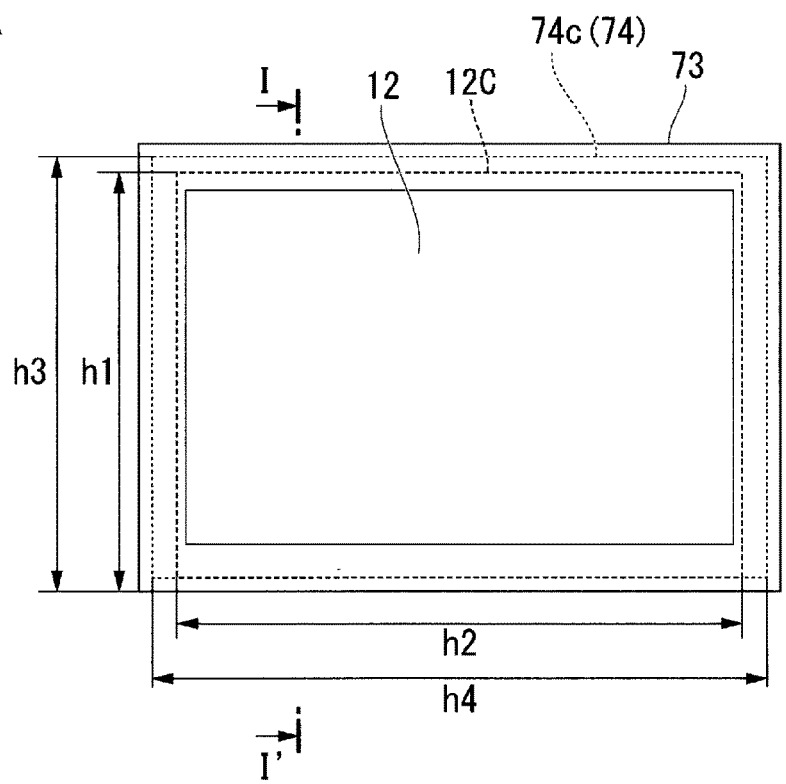
FIG. 28A is a plan view schematically illustrating a configuration of a lighting unit in a lighting device according to a seventh embodiment.
Figure 28B:
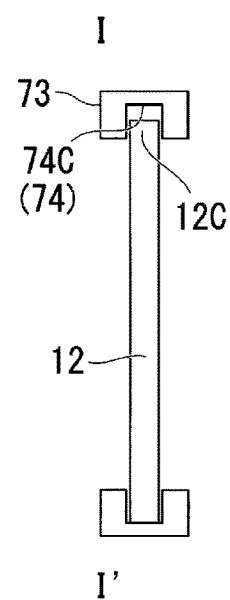
FIG. 28B is a diagram schematically illustrating a configuration of the lighting unit in the lighting device according to the seventh embodiment and is a cross-sectional view along a line I-I' of FIG. 28A.

FIGS. 28A and 28B are diagrams schematically illustrating a configuration of a lighting unit in a lighting device according to the seventh embodiment, FIG. 28A is a front view, and FIG. 28B is a cross-sectional view along a line I-I' of FIG. 28A.

Figure 29A:
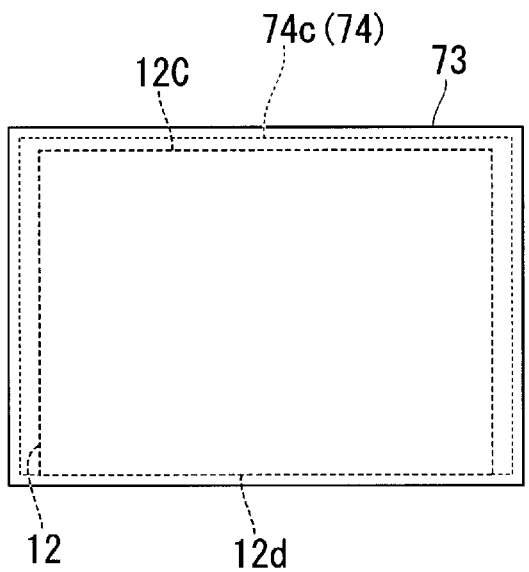
FIG. 29A is a diagram illustrating a state where a modification is generated in the lighting sheet due to changes in a surrounding temperature and is a diagram illustrating a state at a normal temperature.
Figure 29B:
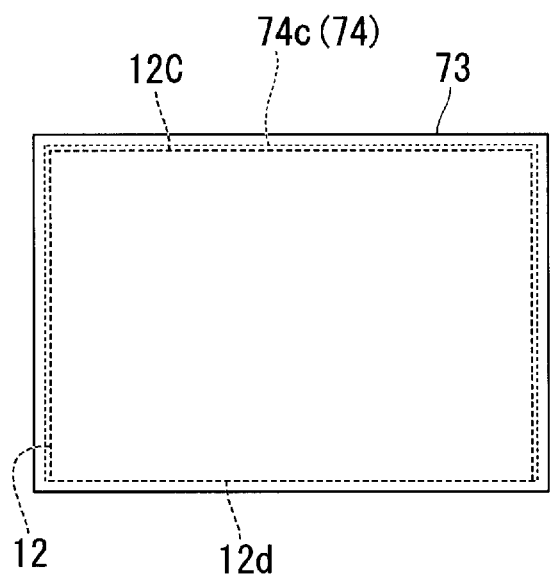
FIG. 29B is a diagram illustrating a state where a modification is generated in the lighting sheet due to changes in a surrounding temperature and is a diagram illustrating a state at a high temperature (during expansion changes).

FIGS. 29A and 29B are diagrams illustrating a state where a modification is generated in the lighting sheet due to changes in a surrounding temperature, FIG. 29A is a diagram illustrating a state at a normal temperature, and FIG. 29B is a diagram illustrating a state at a high temperature (during expansion changes).

As illustrated in FIGS. 28A and 28B, the lighting device 70 of the present embodiment includes a frame 73 having surplus inner dimension of a groove portion 74 with respect to the other dimension of the lighting sheet 12. In particular, the frame 73 has a structure in which inner dimensions h3 and h4 of the groove portion 74 holding the lighting sheet 12 is greater than outer dimensions h1 and h2 of the lighting sheet 12 in the vertical direction and the horizontal direction. Therefore, it becomes a configuration which is capable of corresponding to the shape changes in the lighting sheet 12 expanding due to the surrounding temperature changes. The opening potion 73A of the frame 73 is formed in an opening area smaller than the area of the lighting sheet 12 in the plan view.

As illustrated in FIG. 29A, the lighting sheet 12 is maintained during a normal temperature in a state where the lighting sheet 12 has surplus with respect to the groove portion 74 of the frame 73. In particular, the lighting sheet 12 is held by the frame 73 in a state where a lower end surface 12d abuts to a bottom surface 74c of the groove portion 74 of the frame 73 and a space is provided between a side end surface 12e other than the lower end surface 12d and the bottom surface 74c of the groove portion 74. Therefore, the temperature of the surrounding environment becomes higher, and even in a case where the lighting sheet 12 is dilation deformed in a plane direction as illustrated in FIG. 29B, the peripheral portion 12C of the lighting sheet 12 maintains the flat posture without bending due to the abutting the peripheral portion 12C of the lighting sheet 12 to the bottom surface 74c of the groove portion 74.

Figures 30, 31A:
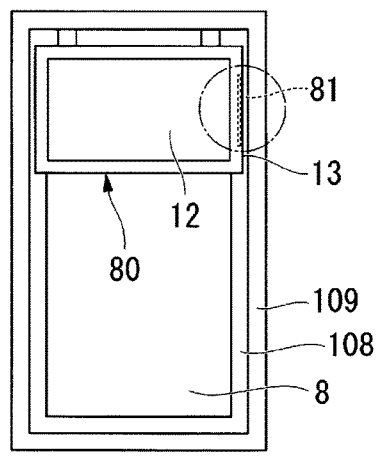
FIG. 30 is a diagram illustrating a relationship between shape changes in associated with the temperature changes and an average linear expansion coefficient.
FIG. 31A is a front view illustrating an overall configuration of a lighting device according to an eighth embodiment.

FIG. 30 is a diagram illustrating a relationship between shape changes in associated with the temperature changes and an average linear expansion coefficient.

In FIG. 30, as a main material to be used in the lighting sheet 12, acryl, PET, and PC are included. An average linear expansion coefficient of each material is about 7 ($10^{-5}/°$ C.).

In one direction of the lighting sheet 12, in a case of the normal temperature (20° C.), a margin of 4.2 mm/m or more is provided to the inner shape dimension of the groove portion 74 with respect to the outer shape dimension of the lighting sheet 12. Therefore, in a case of the high temperature (80° C.), it is possible to prevent the lighting sheet 12 from being abutted to the inner side (bottom surface 14c of the groove portion 14) of the frame 73.

In a case where the lighting sheet 12 is designed so as to hold the lighting sheet 12 without space in the frame 73, it is not possible to correspond to the expansion change in the lighting sheet 12 and the lighting sheet 12 cannot be held in a flat state. Accordingly, in consideration of the temperature change in the surrounding environment which is capable of predicting in advance, by setting the dimension of the groove portion 74 of the frame 73 according to an expansion coefficient of the lighting sheet 12, it is possible to successfully hold the lighting sheet 12 regardless of the temperature changes due to the season or a disposing place.

[Eighth Embodiment]

Next, a lighting device of an eighth embodiment according to the present invention will be described.

FIG. 31A is a front view illustrating an overall configuration of a lighting device according to the eighth embodiment.

Figure 31B:
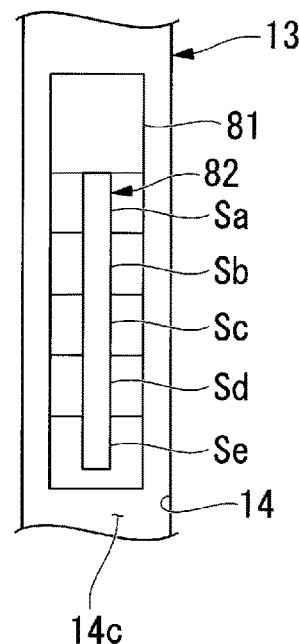
FIG. 31B is a diagram illustrating a disposing state of a temperature detecting material.

FIG. 31B is a diagram illustrating a disposing state of a temperature detecting material.

As illustrated in FIG. 31A and 31B, in a lighting device 80, a temperature detecting member (member for adjusting a temperature) 81 is provided in an inner portion of the frame 13 holding the lighting sheet 12.

When the lighting device 80 is in an abnormal high temperature state of the predetermined temperature or higher, the temperature detecting member 81 displays the temperature, irreversibly. For example, as the temperature detecting member 81, a detection unit 82 which is formed of a plurality of regions Sa to Se which are sequentially discolored according to the temperature is included, and an irreversible detection seal in which when the color of the detection seal is changed once, the color is not returned to the original color can be adopted.

Therefore, it is possible to recode the temperature changes in the lighting device 80 without usually monitoring the temperature of the lighting device 80. In addition, since it is possible to irreversibly display the temperature changes in the lighting device 80, it becomes a sign indicating that a cause when the abnormal is generated in the lighting device 80 is a heat.

The temperature detecting member 81 of the present embodiment is attached to the bottom surface 14c of the groove portion 14 in the frame 13. However, it is not limited thereto. The temperature detecting member 81 is attached to a surface of the outer side of the frame so as to cause the user to easily recognize the temperature detecting member 81.

[Ninth Embodiment]

Next, a lighting device of a ninth embodiment according to the present invention will be described.

Figure 32:
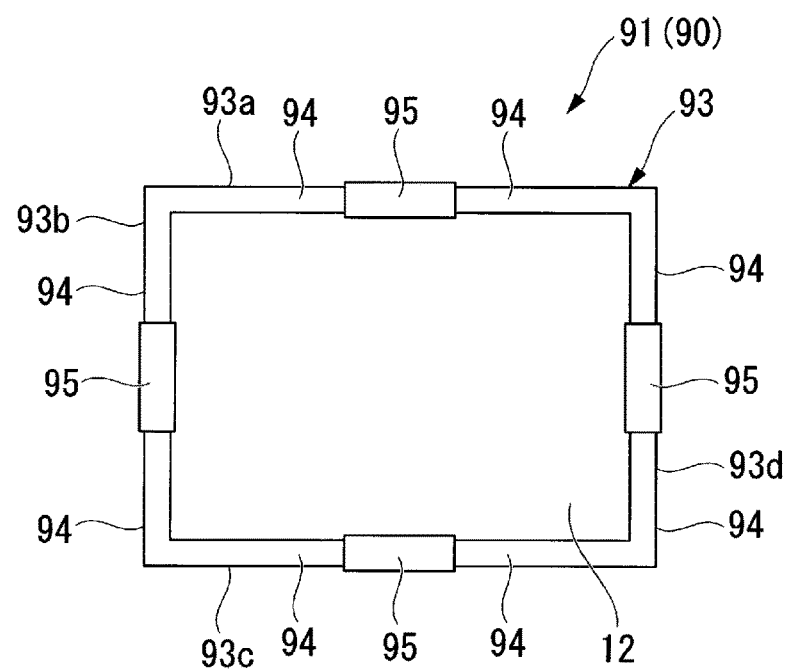
FIG. 32 is a plan view illustrating a main configuration of a lighting unit in a lighting device according to a ninth embodiment.

FIG. 32 is a plan view illustrating a main configuration of a lighting unit in a lighting device according to the ninth embodiment. As illustrated in FIG. 32, a lighting device 90 (lighting unit 91) of the present embodiment includes a frame 93 in which a part of side portions 93a, 93b, 93c, and 93d is formed from a buffer material 95.

In each of the side portions 93a, 93b, 93c, and 93d of the frame 93, the buffer material 95 is disposed between the pair of frame members 94. As the buffer material 95, a soft material (may be an elastic material such as rubber) is preferable.

The entire the frame 93 is not configured by a metal member, and a part thereof is configured by including the buffer material 95. Therefore, it is possible to relieve a distortion of the peripheral members due to the thermal expansion or contraction of the frame 93. In the present embodiment, since each of the side portions 93a, 93b, 93c, and 93d configuring the frame 93 includes the buffer material 95, respectively, it is possible to correspond to the shape changes in the frame 93 in the vertical direction and the horizontal direction.

[Tenth Embodiment]

Next, a lighting device of a tenth embodiment according to the present invention will be described.

Figure 33:
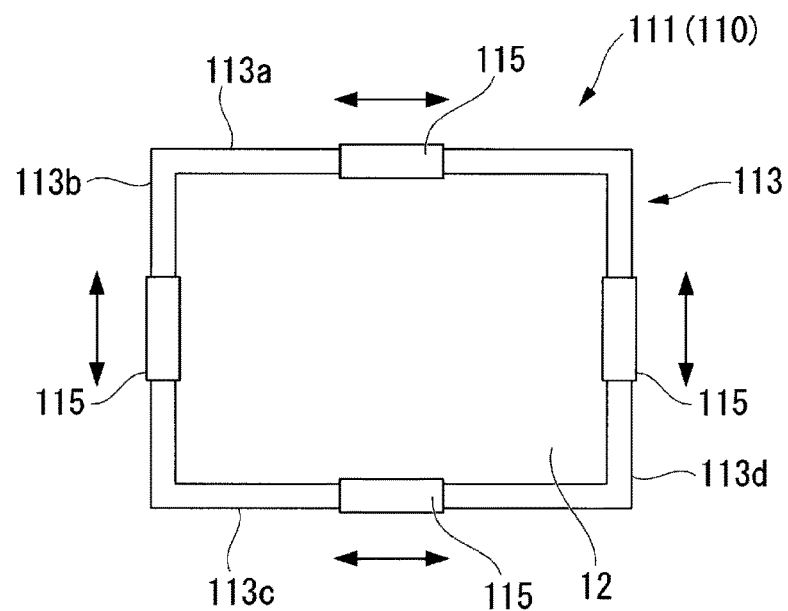
FIG. 33 is a plan view illustrating a main configuration of a lighting unit in a lighting device according to a tenth embodiment.
Figure 34:
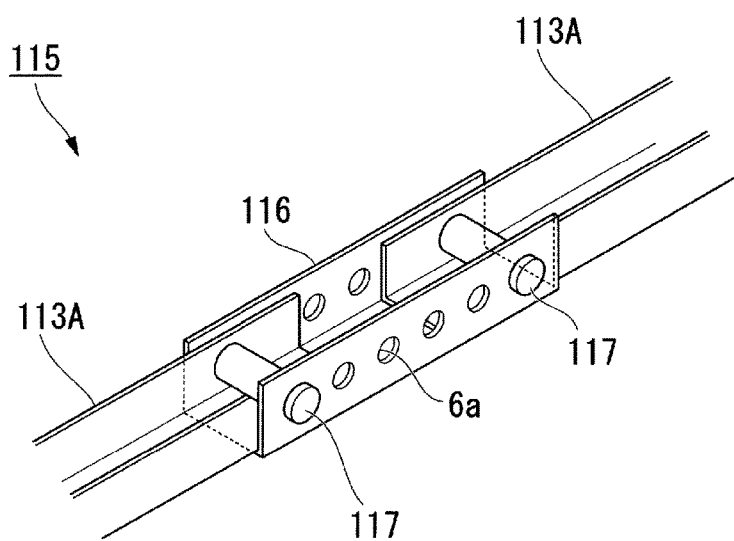
FIG. 34 is a perspective view for illustrating a configuration of a frame of the tenth embodiment.

FIG. 33 is a plan view illustrating a main configuration of a lighting unit in a lighting device according to a tenth embodiment. FIG. 34 is a perspective view for illustrating a configuration of a frame of the tenth embodiment.

As illustrated in FIG. 33, a lighting device 110 (lighting unit 111) of the present embodiment has a configuration in which the size of a frame 113 holding the lighting sheet 12 can be freely adjusted.

In the frame 113, an expansion portion 115 is provided in each of side portions 113a, 113b, 113c, and 113d which form a frame shape and the frame 113 is capable of expansion and contraction in a direction along the outer periphery of the frame 113.

As illustrated in FIG. 34, the expansion portion 115 includes a coupling tool 116 for coupling a pair of frame members 113A and 113A and a pair of screws 117 and 117 for fixing each of frame members 113A and the coupling tool 116, respectively. In the coupling tool 116, a plurality of position adjusting holes 6a which is capable of adjusting of the fixing position of each of the frame member 113A and 113A is formed, and by crewing the screw 117 and the screw hole (not illustrated) of at least of the position adjusting hole 6a and the frame members 113A and 113A side, the coupling tool 116 is coupled to the frame members 113A and 113A.

According to the expansion portion 115 of the present embodiment, it is possible to adjust the size of the frame 113 by changing the fixing position of the frame members 113A and 113A with respect to the coupling tool 116, instead of the position adjusting hole 6a for screwing in accordance with the size of the window.

Therefore, when the lighting sheet 12 is held in the frame 113, for example, since the lighting sheet 12 is held without bending the lighting sheet 12, the working for assembly the lighting sheet 12 to the frame 113 becomes easier.

[Eleventh Embodiment]

Next, a configuration of a lighting device of an eleventh embodiment will be described.

Figure 35:
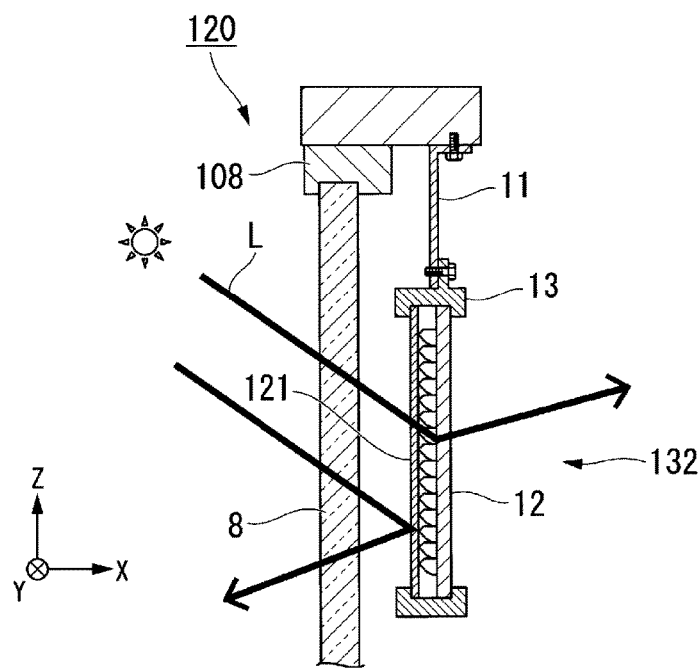
FIG. 35 is a cross-sectional view illustrating a schematic configuration of a lighting device of an eleventh embodiment.

FIG. 35 is a cross-sectional view illustrating a schematic configuration of a lighting device of the eleventh embodiment.

As illustrated in FIG. 35, in a lighting device 120, the lighting sheet 12 and an ultraviolet protection layer 121 which is provided in an incident light side of the lighting sheet 12 include a lighting unit 122 which is stored in the frame 13. The ultraviolet protection layer 121 is a film through which a visible light ray is passed by substantially protecting the ultraviolet ray.

By disposing the ultraviolet protection layer 121 to the light incident side of the lighting sheet 12, it is possible to suppress a deterioration of the lighting sheet 12 due to the ultraviolet. Therefore, the lighting sheet 12 can be used for a long periods, and it is not require the maintenance such as the replacing. In addition, in the ultraviolet protection layer 121, by covering the fine structure surface side of the lighting sheet 12, the fine structure can be protected and the cleaning or the like is also easily performed. In addition, burning (fading) of the furniture or the wall material indoors is suppressed.

Figure 36:
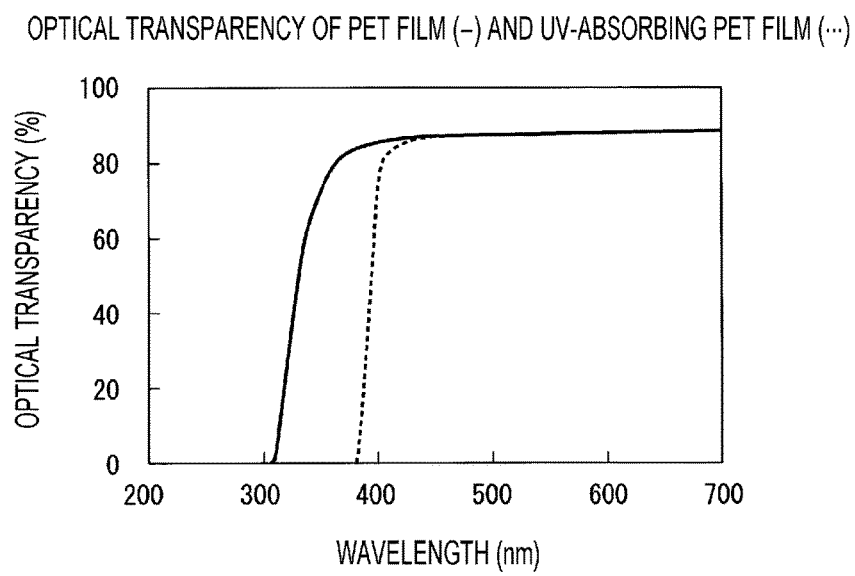
FIG. 36 is a graph illustrating a light transmittance of a PET film in which a UV protection measure is subjected (a graph indicated by a broken line) and a light transmittance in the PET film in which the UV protection measure is not subjected (a graph indicated by a solid line).

FIG. 36 is a graph illustrating a light transmittance of a PET film in which a UV protection measure is subjected (a graph indicated by a broken line) and a light transmittance in the PET film in which the UV protection measure is not subjected (a graph indicated by a solid line). A horizontal axis of a graph in the drawing represents a wavelength (nm) and a vertical axis represents a light transmittance (%).

As the ultraviolet protection layer 121 to be used in the lighting device 120 of the present embodiment, a UV absorptive material which absorbs the light having a wavelength of 300 nm to 380 nm may be mixed to a PET film. As a result that the UV absorptive material is mixed to the PET film, a transmission spectrum of the ultraviolet protection layer 121 has characteristics as illustrated in a graph of the broken line of FIG. 36.

The PET film to which the UV absorptive material is mixed is adopted as the ultraviolet protection layer 121 in the present embodiment and the ultraviolet protection layer 121 is disposed on the light incident side of the lighting sheet 12. Therefore, the deterioration (fading) in the lighting sheet 12 is suppressed and the lighting device 120 which can withstand long-term use can be obtained.

[Twelfth Embodiment]

Next, a configuration of a lighting device of a twelfth embodiment will be described.

Figure 37:
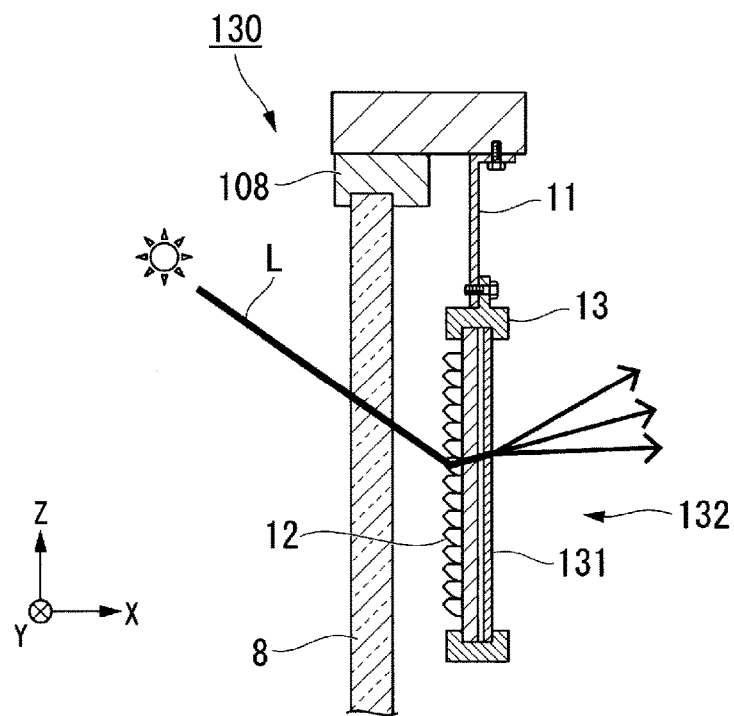
FIG. 37 is a cross-sectional view illustrating a configuration of a lighting device according to a twelfth embodiment.
Figure 38:
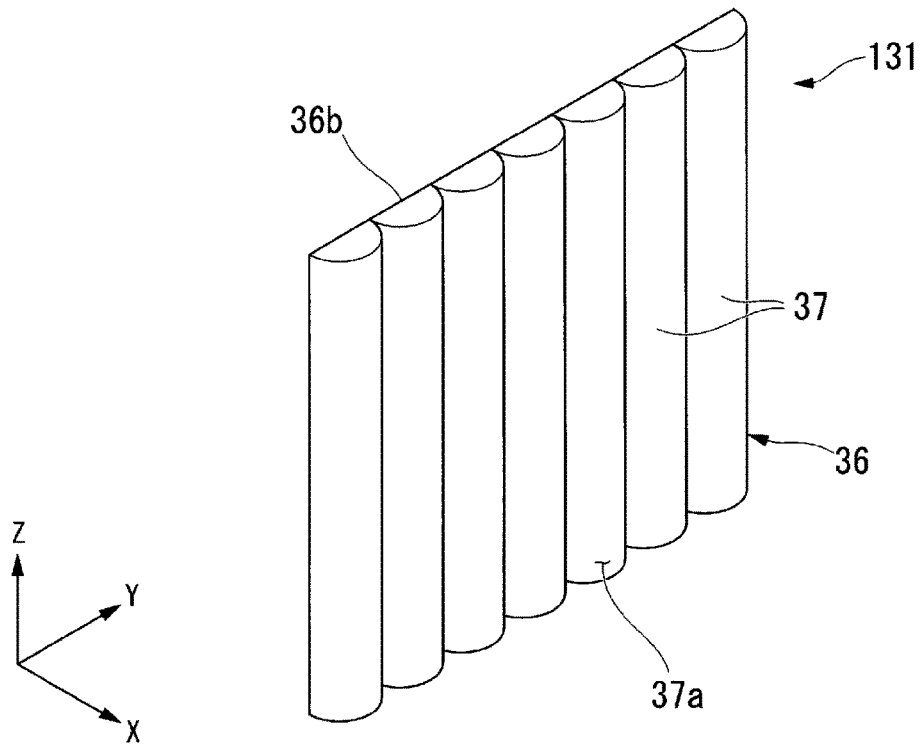
FIG. 38 is a perspective view illustrating a form of a light diffusion layer.

FIG. 37 is a cross-sectional view illustrating a configuration of a lighting device according to the twelfth embodiment. FIG. 38 is a perspective view illustrating an aspect of a light diffusion layer.

As illustrated in FIG. 37, in a lighting device 130 of the present embodiment, the lighting sheet 12 and a light diffusion layer 131 include a lighting unit 132 which is stored in the frame 13.

The light diffusion layer 131 is disposed in the light emission side of the lighting sheet 12 and may diffuse and emit the light from the lighting sheet 12 indoors. The light diffusion layer 131 of the present embodiment has anisotropism to the light diffusion properties and is configured so as to show the high light diffusion properties in the Y direction (horizontal direction).

In particular, as illustrated in FIG. 38, the light diffusion layer 131 is formed of a lenticular lens structure 36 which is configured by a plurality of convex lens portions (convex portion) 37. Each of the plurality of convex lens portions 37 extends in a Z direction (vertical direction) and the convex lens portions 37 are arranged in parallel in the Y direction. The light diffusion layer 131 having such a structure is provided in a posture that a rear surface 36b side of the lenticular lens structure 36 is facing the lighting sheet 12.

A lens surface of 37a of the convex lens portion 37 has a curvature in a horizontal plane and has no curvature in the vertical direction. Therefore, the convex lens portion 37 has high light diffusion properties in the Y direction (horizontal direction) and has no light diffusion properties in the vertical direction. Accordingly, the light which is incident to the light diffusion layer 131 is greatly diffused in the Y direction (horizontal direction), when the light is emitted from the convex lens portion 37 and the diffused light is emitted without diffusing in the vertical direction.

Next, light diffusion properties of the light diffusion layer will be described.

Figure 39:
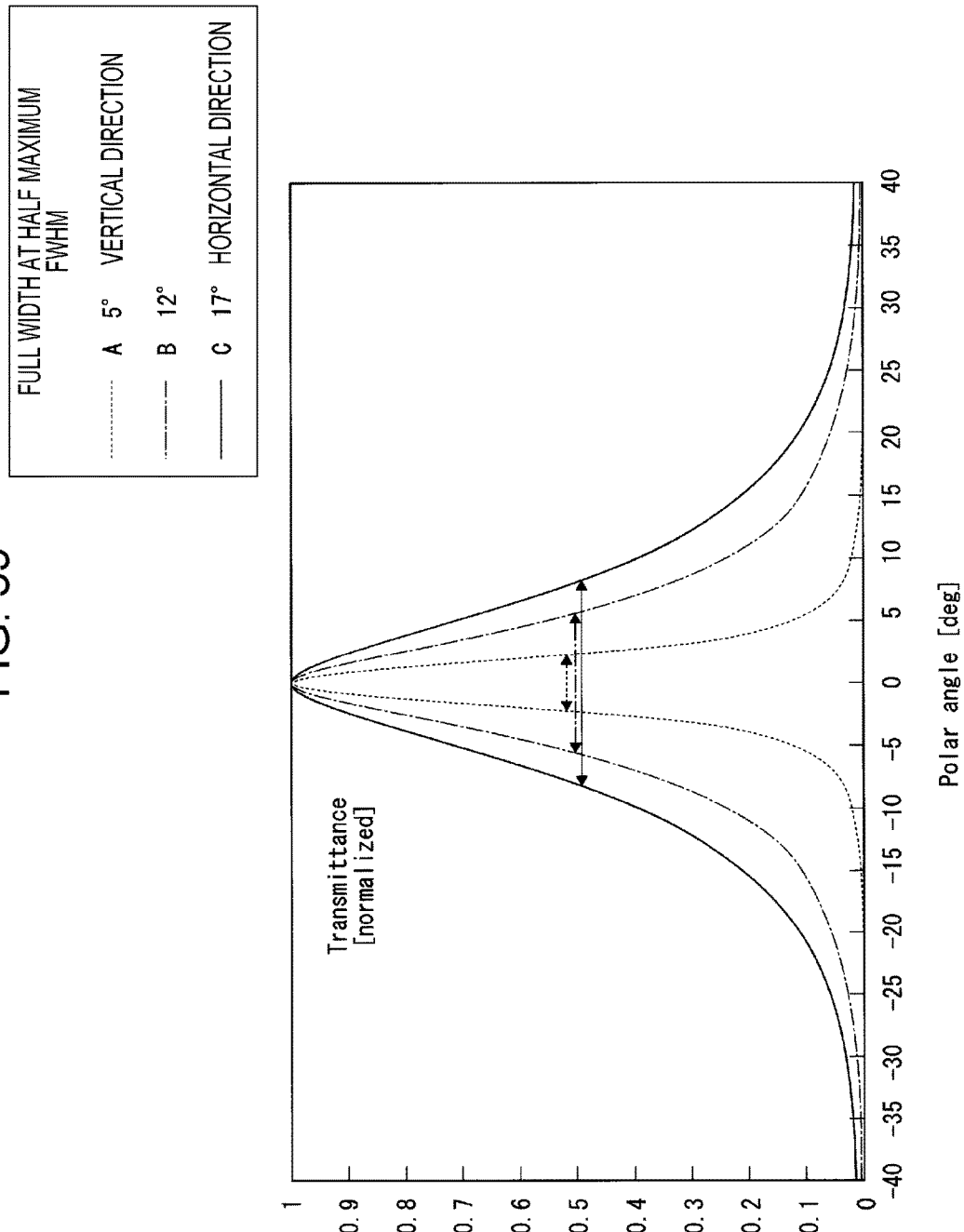
FIG. 39 is a graph illustrating light scattering properties of the light diffusion layer.

FIG. 39 is a graph illustrating light scattering properties of the light diffusion layer. In particular, FIG. 39 is a graph in which measurement light is radiated from a perpendicular direction with respect to the light diffusion layer, and regarding the light intensity which is obtained by receiving the light by moving a photoreceiver at an opposite side, a peak value is standardized as 1.

As a full width at half maximum of the light diffusion layer in the Y direction (horizontal direction), about 15 degrees to 60 degrees of the full width at half maximum is used.

On the other hand, as the diffusion level of the light diffusion layer in the Z direction (vertical direction), a weak scattering film having about several degrees to 20 degrees of the full width at half maximum is preferable so as not to deteriorate the directional characteristics of the light illuminating in the ceiling direction. When the light is spread in the vertical direction, the light illuminating in the ceiling direction is diffused in a direction of the person in the floor side indoors, and the brightness of the light to be viewed by the person becomes greater compared to a case of the high directional characteristics. Therefore, as the light diffusion layer, an anisotropic scattering layer, in which the light is specifically diffused in the horizontal direction and the light is not nearly diffused in the vertical direction, is preferable.

In the present embodiment, in a case where the full width at half maximum of front measuring light passing through the light diffusion layer 131 is about 5 degrees, the light is diffused at 17 degrees of the full width at half maximum in the horizontal direction, the diffusion of the light in the vertical direction becomes 5 degrees of the full width at half maximum, and almost light is not diffused.

In this manner, the light from the lighting sheet 12 can be specifically diffused and emitted in the horizontal direction by the light diffusion layer 131.

As the light diffusion layer 131, the form other than the above-described form may be used.

Figure 40:
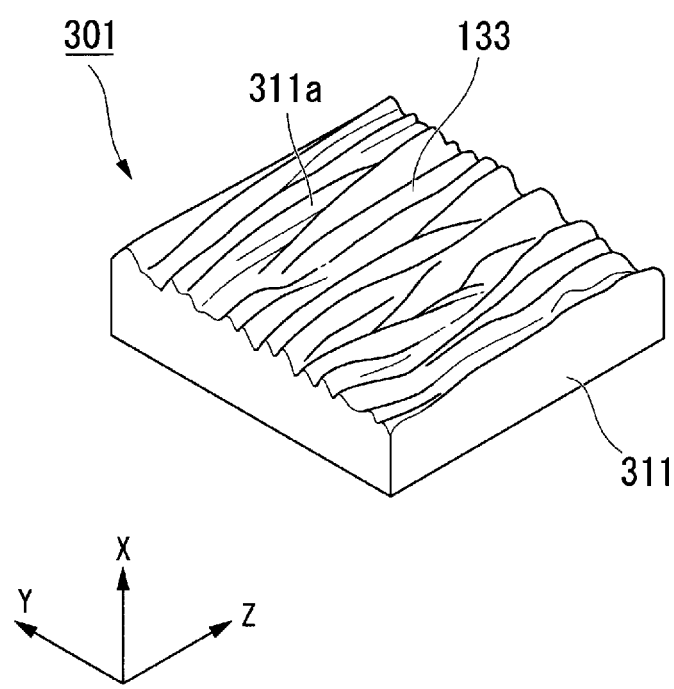
FIG. 40 is a perspective view illustrating the other form of the light diffusion layer.

For example, as illustrated in FIG. 40, a light diffusion layer 301 having a streak-like fine shape including a plurality of convex portions 133 extending in one direction may be used in one surface 311a side of a supporting base material 311. In the light diffusion layer 301, the convex portions 133 extending roughly in the short-hand direction (Z direction) are arranged in the longitudinal direction (Y direction) of the supporting base material 311 and has a so-called pseudo-stripe structure. In this manner, the light diffusion layer 301 having the pseudo-stripe structure, in which the light diffusion properties is provided in one direction (Y direction) and the light diffusion properties is rarely provided in the other direction (Z direction) perpendicular to the one direction.

Figure 41A:
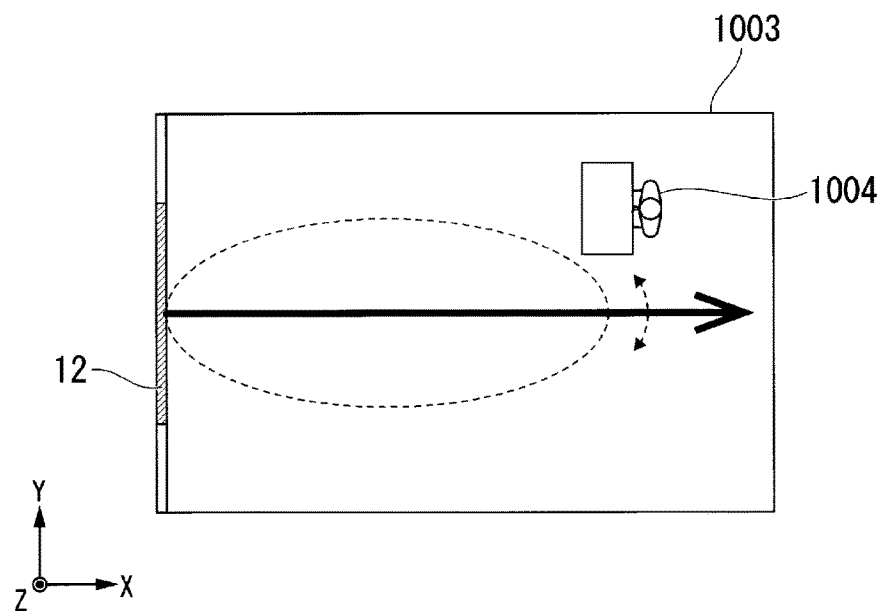
FIG. 41A is a schematic diagram of the room model for illustrating light diffusion properties of a lighting slat and is a diagram of a room when viewed from the top.
Figure 41B:
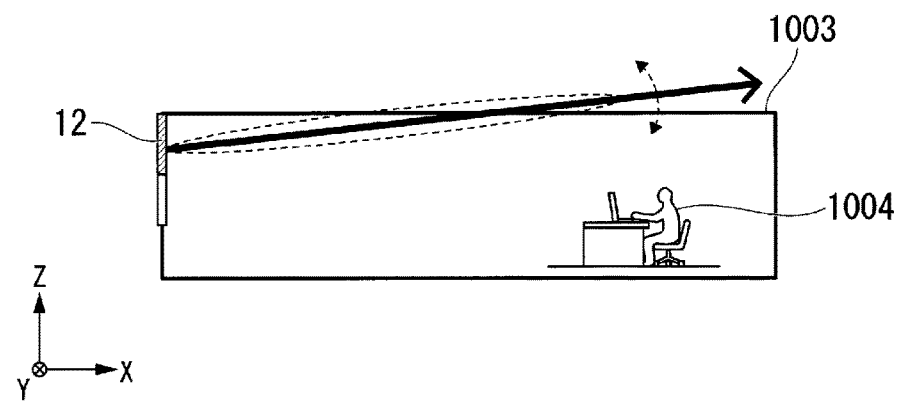
FIG. 41B is a schematic diagram of the room model for illustrating light diffusion properties of a lighting slat and is a diagram of a room when viewed from the side.

FIGS. 41A and 41B are schematic diagrams of the room model for illustrating light diffusion properties of a lighting slat, FIG. 41A is a diagram of a room when viewed from the top, and FIG. 41B is a diagram of a room when viewed from the side.

As illustrated in FIGS. 41A and 41B, in a case where the light diffusion properties is not applied to the lighting sheet 12 (an arrow indicated by the solid line), the external light lighted to the lighting sheet 12 is straightly incident to the room 1003. Accordingly, a day when the solar light is directed to the lighting device such as a clear day is depending on the solar altitude. When the solar light which is refracted by the lighting sheet 12 is reflected and the light ray to be radiated to the ceiling originally is viewed by the person, the light is glare and it is recognized as the uncomfortable glare. Since the solar light can be set as a point light source having extremely high brightness and the directional characteristics, in a case where the light is straightly incident, the light ray is incident to the room while having the characteristics such as the high brightness and high directional characteristics. If this light is entered to the eyes of the person 1004 in the room, the person feels extremely glare.

It is preferable that the light diffusion layer 131 is included as a purpose of preventing the glare. It is preferable that the external light including the solar light which is incident from the outside is diffused before the external light is incident indoors, is converted into soft light, and is provided. As illustrated in FIG. 41A, by specifically diffusing the light in the horizontal direction of the room 1003 by the light diffusion layer 131, the brightness in the specific direction (vertical direction) is lowered and the glare rarely occurs, as illustrated in FIG. 41B.

In addition, in a case where the light diffusion properties are applied, the amount of the light reached the back of the room is reduced. However, there is an advantage that the spread in the transverse direction can be obtained. By spreading the light in the transverse direction, even in a case of the small window, it is possible to bright entire the room from the end to the end (transverse direction). In addition, there is an advantage that the solar light is entered diagonally, it is possible to brighten up the center of the room.

[Thirteenth Embodiment]

Next, a lighting device of a thirteenth embodiment according to the present invention will be described.

Figure 42:
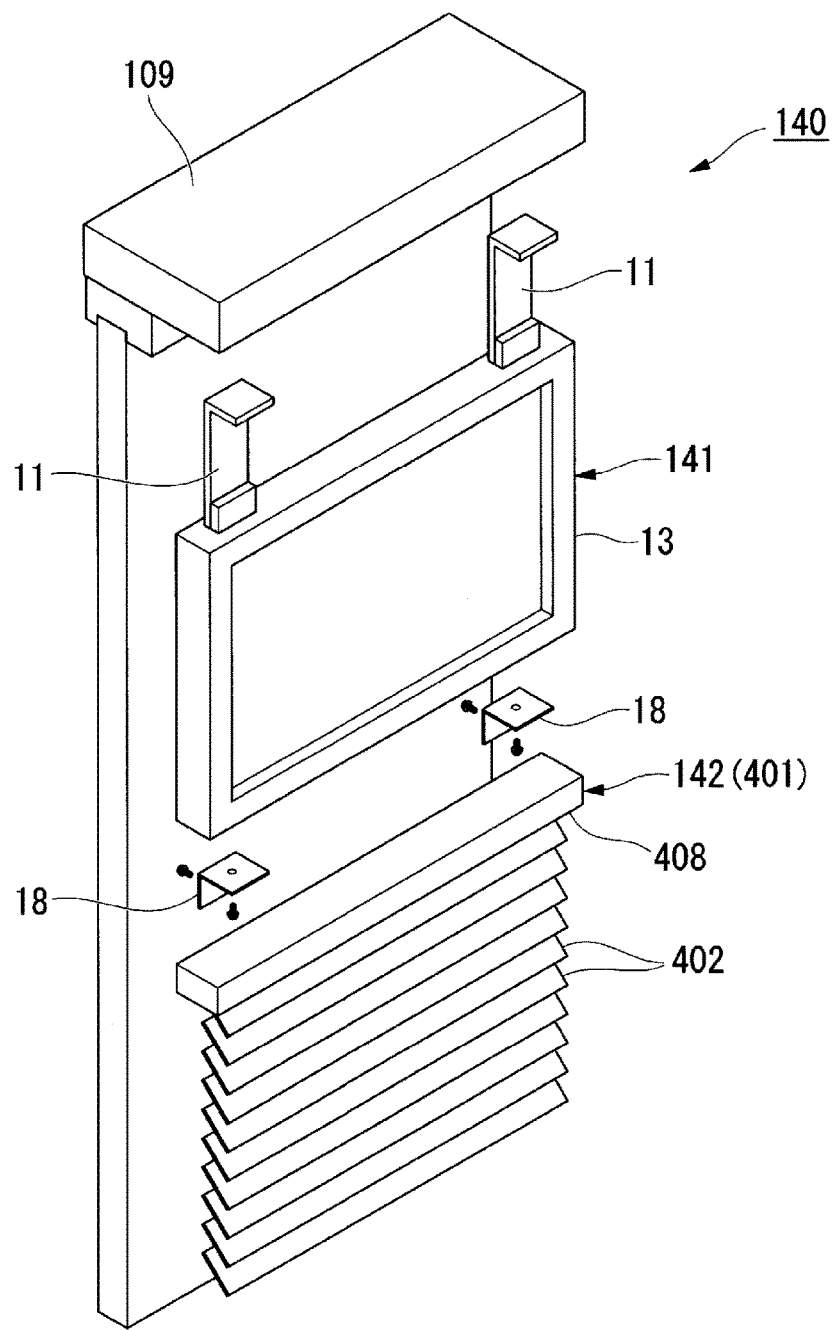
FIG. 42 is a perspective view illustrating a configuration of a lighting device according to a thirteenth embodiment.
Figure 43:
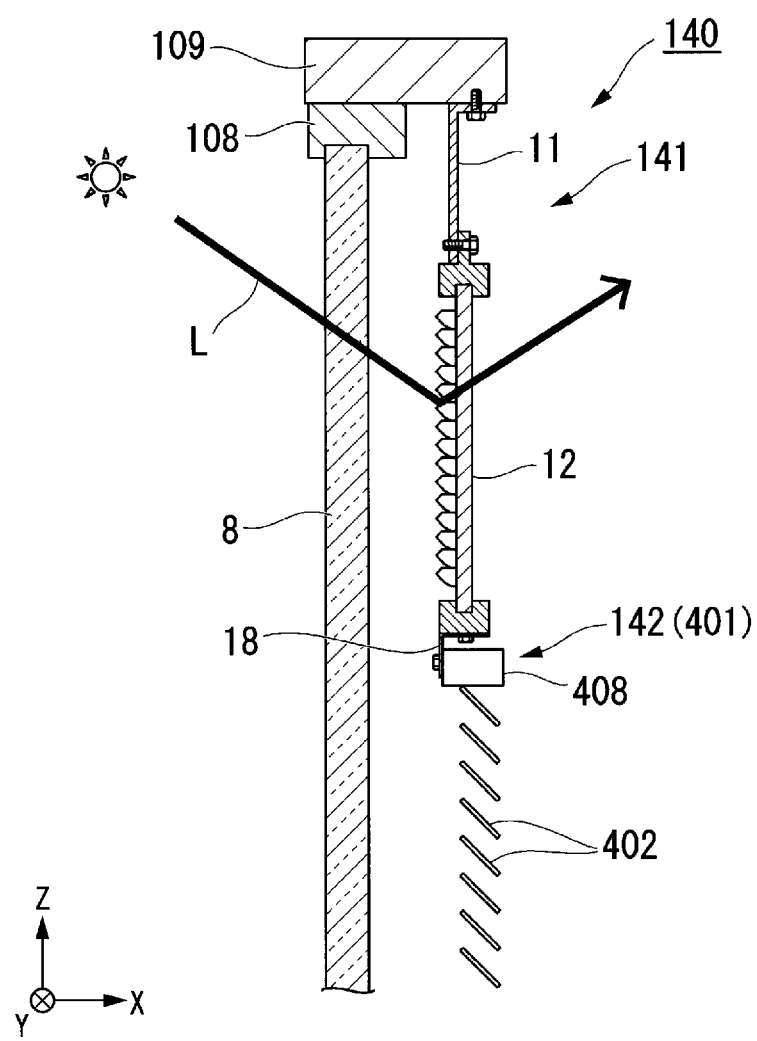
FIG. 43 is a cross-sectional view illustrating the configuration of the lighting device according to the thirteenth embodiment.

FIG. 42 is a perspective view illustrating a configuration of a lighting device according to the thirteenth embodiment. FIG. 43 is a cross-sectional view illustrating the configuration of the lighting device according to the thirteenth embodiment.

As illustrated in FIGS. 42 and 43, a lighting device 140 of the present embodiment has a configuration further including a light shielding unit 142 at the lower side of a lighting unit 141.

The light shielding unit 142 is attached to the lower portion of the lighting unit 10 through a pair of attachment portions 18 and 18. In the present embodiment, a window shade 401 is used as the light shielding unit 142. The window shade 401 includes a plurality of lighting slats 402 which are disposed in an array at a predetermined distance, a tilting mechanism (not shown) supporting the plurality of lighting slats in a tilting and free manner to each other, and a storage mechanism 408 which folds the plurality of lighting slats 402 which are coupled to each other to be able entering by the tilting mechanism (not shown) and stores the folded lighting slats 402.

Such a window shade 401 is fixed by attaching the storage mechanism 408 to the lower portion of the frame 13 of the lighting unit 141 by the pair of the attachment portions 18 and 18.

Until now, in a case where the window shade 401 is provided so as to cover one surface of the window from the viewpoint of the privacy or the viewpoint of the light shielding purpose, when closing the window shade 401, entire the room becomes darker. Accordingly, eventually, it is necessary to turn on the illumination, although in the daylight.

As illustrated in FIG. 43, since the lighting device 140 of the present embodiment has a configuration including a shielding vision function of the light shielding unit 142 and the lighting function of the lighting unit 141, even in a state where the window shade 401 is closed, the external light can be radiated indoors by lighting the external light by the lighting unit 141 and the indoor is not darkened. In addition, by adjusting the closing state of the window shade 401, the brightness of the indoor can be operated. As a result, it is not necessary to turn on a light bulb in the indoor in day time. Accordingly, the power to be consumed by the lighting equipment in the daylight can be reduced.

In the present embodiment, the window shade 401 is used as the first light shielding unit 142. However, it is not limited thereto, and a roll curtain or the like may be used.

Since the lighting device 140 of the present embodiment can be manufactured by the same depth dimension as that of the window shield or the roll curtain, it is not required to protect the disposing place indoors newly, and it can be used in the same way as conventional.

[Fourteenth Embodiment]

Next, a lighting device of a fourteenth embodiment according to the present invention will be described.

Figure 44:
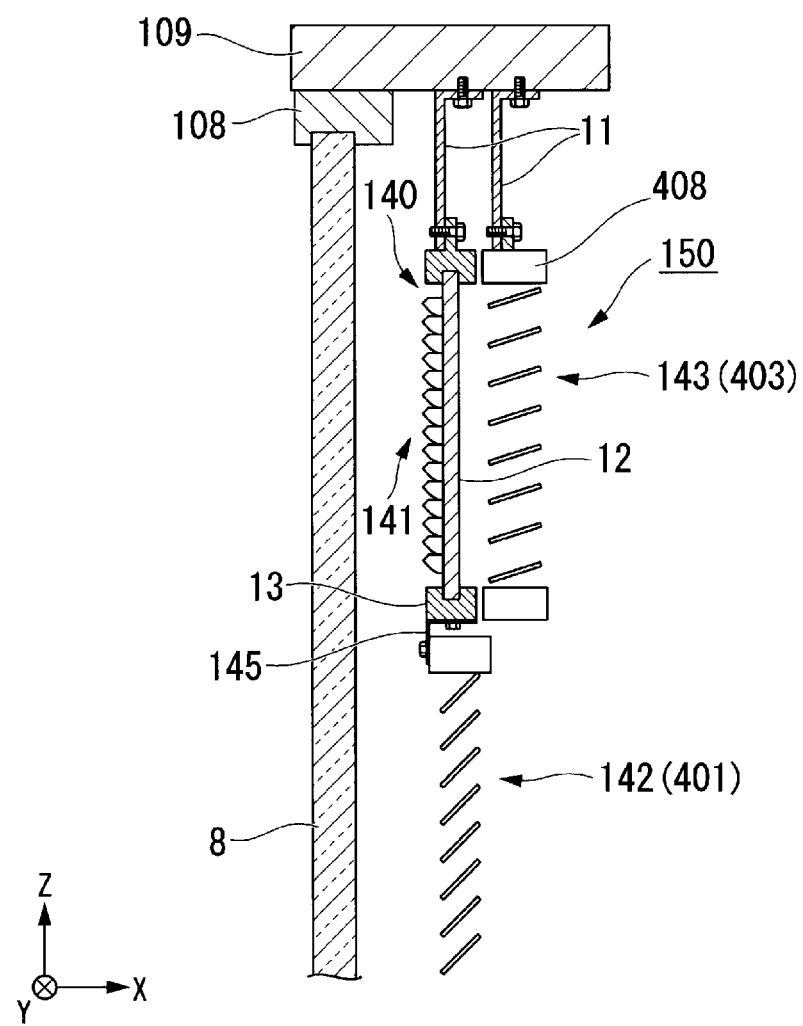
FIG. 44 is a diagram illustrating a configuration of a lighting device according to a fourteenth embodiment.
Figure 45A:
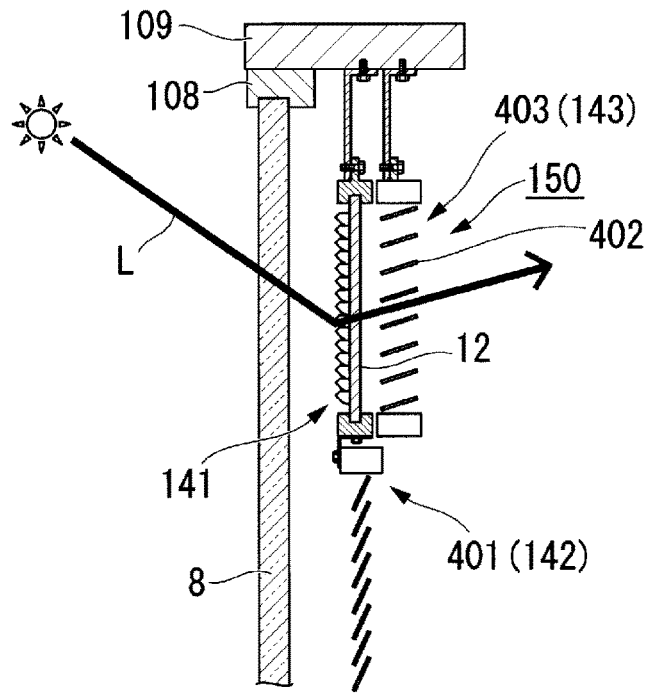
FIG. 45A is a diagram for illustrating a function of the lighting device according to the fourteenth embodiment and is a diagram illustrating a state where a window shade is open.
Figure 45B:
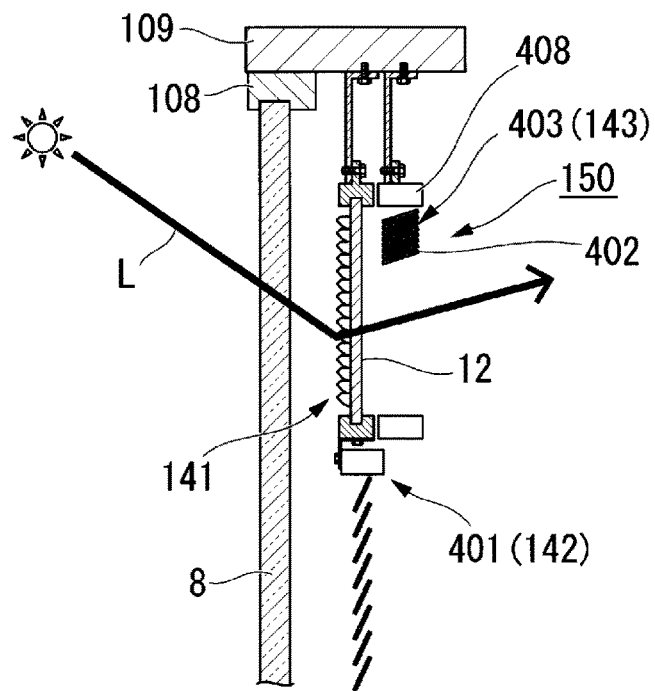
FIG. 45B is a diagram for illustrating the function of the lighting device according to the fourteenth embodiment and is a diagram illustrating a state where the window shade is open.
Figure 45C:
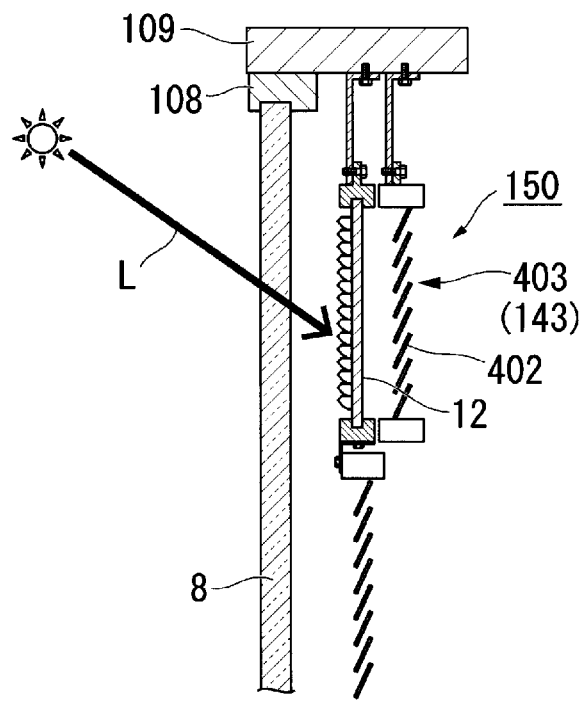
FIG. 45C is a diagram for illustrating a function of the lighting device according to the fourteenth embodiment and is a diagram illustrating a state where a window shade is closed.

FIG. 44 is a diagram illustrating a configuration of a lighting device according to the fourteenth embodiment. FIGS. 45A to 45C are diagrams for illustrating a function of the lighting device according to the fourteenth embodiment, FIG. 45A is a diagram illustrating a state where a window shade is open, FIG. 45B is a diagram illustrating a state where the window shade is open, and FIG. 45C is a diagram illustrating a state where a window shade is closed.

A lighting device 150 of the present embodiment is configured by including the lighting unit 141, a first light shielding unit 142 which is provided at the lower portion of the lighting unit 141, and a second shielding unit 143 which is provided at the light emission side of the lighting unit 141.

The first light shielding unit 142 is the above-described window shade 401 and is attached to the lower portion of the frame 13 of the lighting unit 141 through an attachment portion 145.

The second shielding unit 143 is a window shade 403 which forms the same configuration as that of the window shade 401 and is attached to the window frame 109 at the light emission side of the lighting unit 141 through the mounting unit 11.

The storage mechanism 408 of the second shielding unit 143 (window shade 403) may be integrally configured with the frame 13 of the lighting unit 141. In this manner, since the number of the mounting units 11 can be reduced, it does not take the trouble of the mounting.

According to the configuration of the present embodiment, it is possible to make the function of the lighting unit 141 to efficient as necessary. That is, as illustrated in FIG. 45A, by setting the window shade 403 which is provided in the light emission side of the lighting unit 141 to the closing state, or, as illustrated in FIG. 45B, storing the entire slats 402 of the window shade 403 to the storage mechanism 408, the light which is lighted by the lighting unit 141 can be collected indoors. On the other hand, as illustrated in FIG. 45C, by closing the window shade 403, it is possible to shield the light from the lighting unit 141.

In this manner, by opening and closing the window shade 403 of the second shielding unit 143, it is possible to switch the lighting state and an overall light shielding state. Accordingly, by closing the window shades 401 and 403 of the first light shielding unit 142 and the second shielding unit 143, respectively, it can completely eliminate the entering of the external light indoors and it cannot be recognize the state of the indoor side from the outdoor side. In a case where the window shade 403 of the second shielding unit 143 is not provided, when turning on the illumination in the indoor in the night, even if the window shade 401 of the first light shielding unit 142 is closed, since the light of the indoor is leaked from the lighting unit 141 side, the state in the indoor can be recognized from the outdoor side. However, by setting the lighting unit 141 side to the overall light shielding state by providing the window shade 403 of the second shielding unit 143, there is a possibility that the privacy effect can further be improved.

[Illumination Dimming System]

Figure 46:
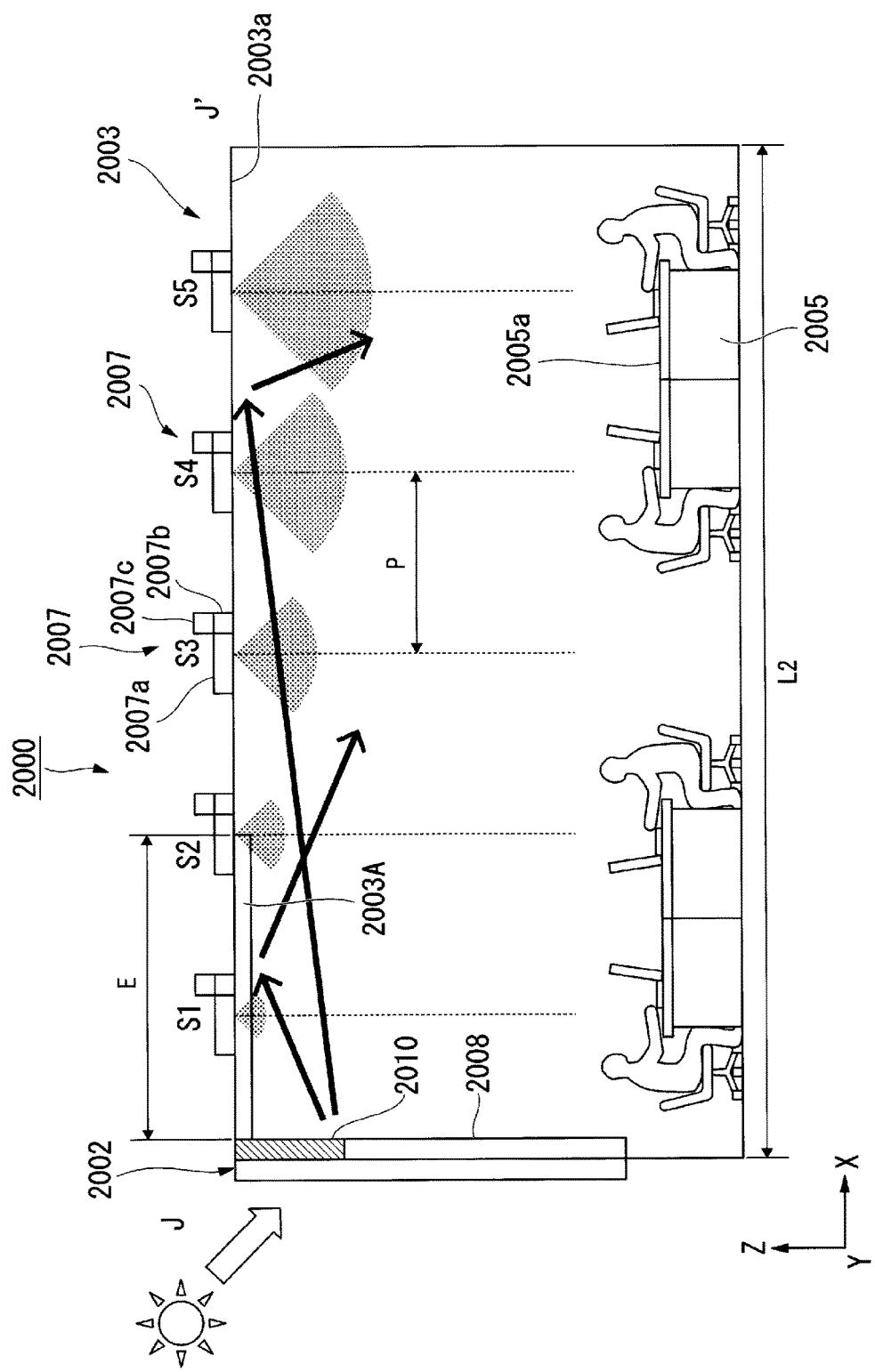
FIG. 46 is a diagram illustrating a room model including the lighting device and an illumination dimming system and is a cross-sectional view along a line J-J' of FIG. 47.
Figure 47:
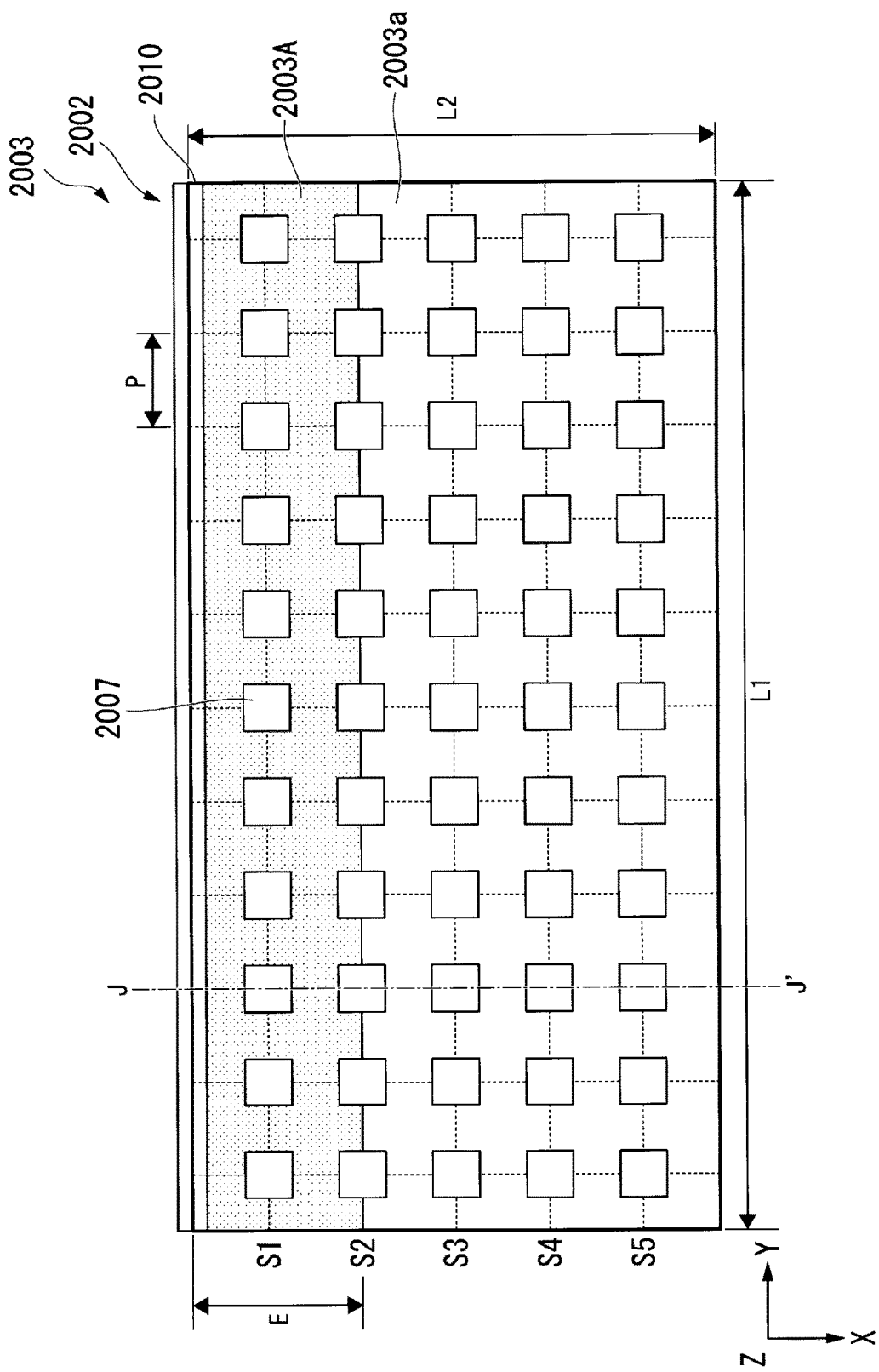
FIG. 47 is a plan view illustrating a ceiling of the room model.

FIG. 46 is a diagram illustrating a room model 2000 including the lighting device and an illumination dimming system and is a cross-sectional view along a line J-J' of FIG. 47. FIG. 47 is a plan view illustrating a ceiling of the room model 2000.

In the present invention, a ceiling material configuring a ceiling 2003a of a room 2003 to which the external light is incident may have the high light diffusion properties. As illustrated in FIGS. 46 and 47, a light reflecting ceiling material 2003A is disposed in the ceiling 2003a of the room 2003 as the ceiling material having the light reflecting properties. Since the light reflecting ceiling material 2003A is aimed to promote entering the external light from a lighting device 2010 which is disposed on a window 2002 to the back indoors, the light reflecting ceiling material 2003A is disposed in the ceiling 2003a at the window. Specifically, the light reflecting ceiling material 2003A is disposed at a predetermined region E (a region which is away from a distance of about 3 m from the window 2002) of the ceiling 2003a.

As described above, the light reflecting ceiling material 2003A serves to guide the external light which is induced indoors through the window 2002, in which the lighting device 2010 (any one of the lighting devices described above) of the invention is disposed, to the back of the indoor with good efficiency. The external light which is induced from the lighting device 2010 toward the ceiling 2003a indoors is reflected to the light reflecting ceiling material 2003A, and by illuminating a top surface of a desk 2005a of a desk 2005 which is placed on the back of the indoor by changing the direction of the external light, it is possible to exhibit the effect for brightening the top surface of a desk 2005a.

The light reflecting ceiling material 2003A may have diffusion reflectivity and may have specularity. In order to have the effect for brightening the top surface of a desk 2005a of the desk 2005 which is placed on the back indoors and the effect for suppressing the glare light which is uncomfortable to the person in the indoor, it is preferable that the both characteristics is appropriately combined.

The most of the light beams which are incident to the indoor by the lighting device 2010 of the present invention is toward the ceiling adjacent to the window 2002.

The amount of the light around the window 2002 is sufficient, in some cases. Accordingly, by using the above-described light reflecting ceiling material 2003A, the light which is incident to the ceiling (region E) around the window can be separated to the back indoors which has small light amount compared to the window side.

The light reflecting ceiling material 2003A is prepared, for example, by performing an embossing process by irregularities of about several tens of the microns on the metal plate such as aluminum, and by evaporating a metal thin film such as aluminum to the surface of a resin substrate to which the same irregularities are formed. Alternatively, the irregularities which are formed by embossing process are formed by a curved surface in which the cycle is long.

Furthermore, by appropriately changing the embossed shape to be formed in the light reflecting ceiling material 2003A, it is possible to suppress the light distribution characteristics of the light or the distribution of the light indoors. For example, in a case where the embossing process is carried out into a strip shape extending to the back of the indoor, the light reflected to the light reflecting ceiling material 2003A is spread in the horizontal direction (a direction intersecting the longitudinal direction of the irregularities) of the window 2002. In a case where the size or the direction of the window 2002 of the room 2003 is limited, by using the properties, the light is dispersed to the horizontal direction by the light reflecting ceiling material 2003A and can be reflected toward the direction of the back indoors.

The lighting device 2010 of the present invention is used as a part of the illumination dimming system of the room 2003. The illumination dimming system is, for example, configured from a configuring member of the entire room including the lighting device 2010, a plurality of indoor illumination device 2007, a solar insolation adjustment device 2008 which is disposed in the window, control systems thereof, the light reflecting ceiling material 2003A which is disposed in the ceiling 2003a.

In the window 2002 of the room 2003, the lighting device 2010 is disposed at the upper portion side, and the solar insolation adjustment device 2008 is disposed at the lower portion side. Here, as the solar insolation adjustment device 2008, the window shade is disposed. However, it is not limited thereto.

The plurality of indoor illumination devices 2007 is disposed in the room 2003 in a lattice pattern in the horizontal direction of the window 2002 (Y direction) and the depth direction indoors (X direction). The plurality of indoor illumination devices 2007 configures the entire illumination system of the room 2003 together with the lighting device 2010.

As illustrated in FIGS. 46 and 47, for example, the ceiling 2003a of the office having a length L1 of the window 2002 in the horizontal direction (Y direction) is 18 m and a length L2 of the room 2003 in the depth direction (X direction) is 9 m is illustrated. Here, the indoor illumination device 2007 is disposed in a lattice pattern at a distance P of 1.8 m, respectively, in the transverse direction (Y direction) and the depth direction (X direction) of the ceiling 2003a.

More specifically, 50 indoor illumination devices 2007 are arranged in 10 columns (Y direction)×5 rows (X direction).

The indoor illumination device 2007 includes indoor lighting equipment 2007a, a brightness detecting unit 2007b, and a control unit 2007c, and has a configuration in which the brightness detecting unit 2007b and control unit 2007c are integrally formed in the indoor lighting equipment 2007a.

The indoor illumination device 2007 may include a plurality of the indoor lighting equipment 2007a and the brightness detecting units 2007b. However, the brightness detecting unit 2007b is provided one by one with respect to each of the indoor lighting equipment 2007a. The brightness detecting unit 2007b receives the reflected light of the surface to be illuminated by the indoor lighting equipment 2007a to detect the illuminance of the surface to be illuminated. Here, the illuminance of the top surface of a desk 2005a of the desk 2005 placed indoors is detected by the brightness detecting unit 200b.

Control units 2007c which are provided in each of the indoor illumination devices 2007 one by one is connected to each other. Each indoor illumination device 2007 performs a feedback control adjusting the light output of each of LED lamps indoors lighting equipment 2007a by the control units 2007c which are connected to each other, such that the illuminance of the top surface of a desk 2005a to be detected by each brightness detecting unit 2007b to be a certain target illuminance L0 (for example, average illuminance: 750 1×).

Figure 48:
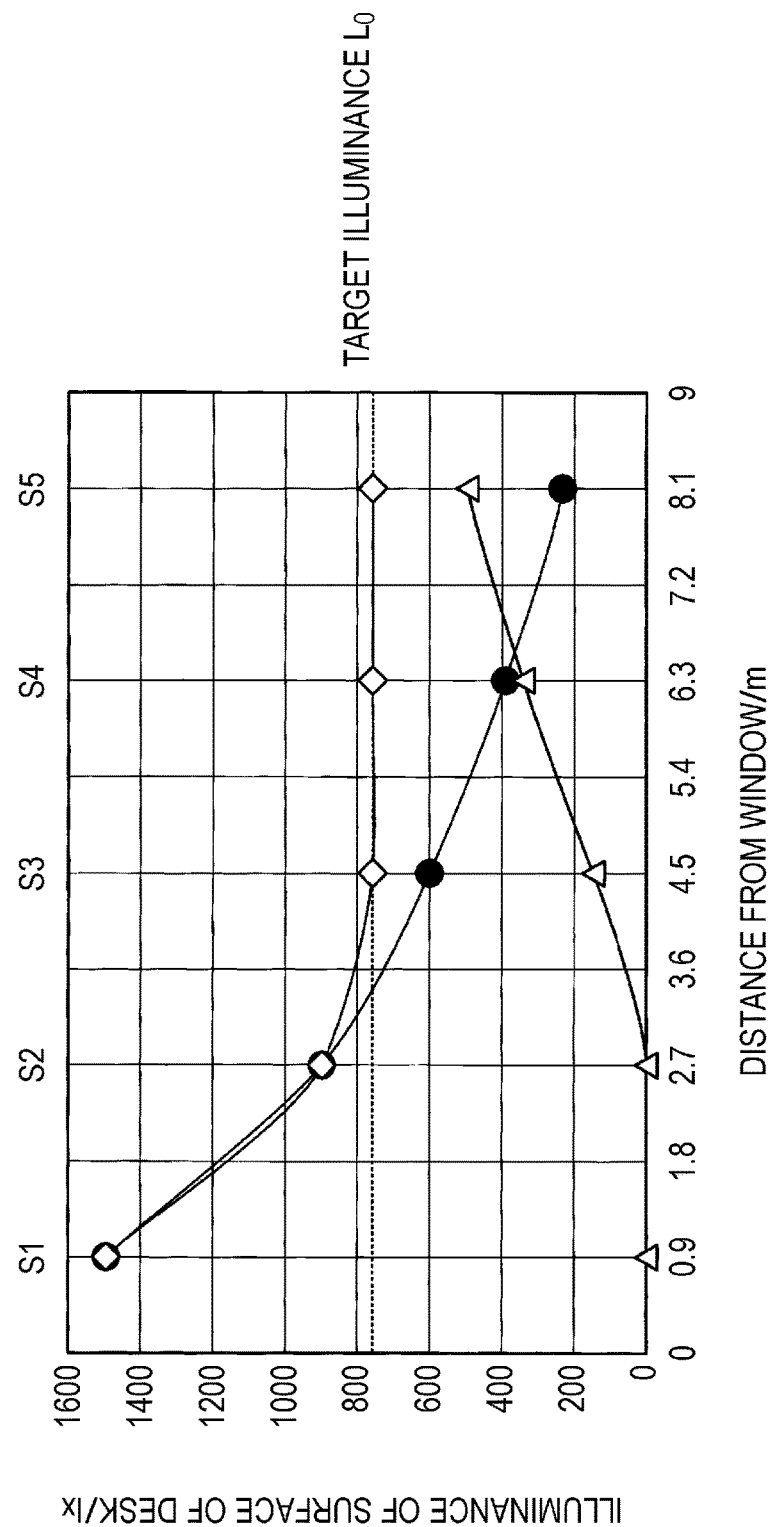
FIG. 48 is a graph illustrating a relationship between an illuminance of light (natural light) lighted indoors due to the lighting device and an illuminance (illumination dimming system) due to an indoor illumination device.

FIG. 48 is a graph illustrating a relationship between an illuminance of light (natural light) lighted indoors due to the lighting device and an illuminance (illumination dimming system) due to an indoor illumination device.

As illustrated in FIG. 48, an illuminance of the surface of the desk caused by the light lighted by the lighting device 2010 is high as approaching nearer to the window and the effect is degraded more distant from the window. In the room which the lighting device 2010 of the present invention is applied, the illumination distribution to the depth direction of the room is generated by the natural light from the window in the day time. The lighting device 2010 of the present invention is used together with the indoor illumination device 2007 which compensates the indoor illumination distribution. The indoor illumination device 2007, which is disposed in the indoor ceiling, detects the average illuminance lower each of the devices by the brightness detecting unit 2007b and is turned on by dimming controlling such that the illuminance of the top surface of the desk in entire the room to be a certain target illuminance L0. Accordingly, almost of a S1 row and a S2 row which are disposed around the window are not turned on, and are turned on while increasing the power toward a S3 row, a S4 row, and a S5 row in a back direction of the room. As a result, the top surface of the desk in the room is illuminated in a total of the illuminance due to the natural light and the illumination due to the indoor illumination device 2007, the illuminance 750 1×("JIS Z9110 illumination general provision") that is the illuminance of the top surface of the desk which is suitable for working across the room.

As described above, by using the lighting device 2010 and the illumination dimming system (indoor illumination device 2007), light can be reached in the back indoors, the brightness indoors can further be improved, and a sufficient illuminance of a surface of a desk can be secured in terms of the office across the room. Accordingly, a bright light environment which is more stabilized without affecting due to the season or the weather can be obtained.

Although a variety of embodiments has been described with reference to the accompanying drawings, it is needless to say that the invention is not limited to the examples. It is apparent to those skilled in the art that various modification examples and improvements may be obtained by contemplations within the scope of the disclosed claims, and thereby it is also understood that all those fall within the technical scope of the invention without any doubt. The configurations of each of the embodiments may be appropriately combined.

For example, the lighting portion 3 is not limited to a lighting portion which is configured by the above-described prism body having a hexagonal shape in cross section and may be a lighting portion which is configured by a prism body having a having a triangular shape in cross section, a trapezoidal shape (rectangular shape) in cross section, or a pentagon shape in cross section and can be appropriately modified.

INDUSTRIAL APPLICABILITY

An aspect of the present invention can be adopted to a lighting device which collects outdoor natural light (solar light) indoors with good efficiency, can cause a person in the indoor to sense brightly the back of the indoor without glare, and can be easily removed from the mounting target, or the like.

REFERENCE SIGNS LIST 1, 20, 30, 40, 50, 60, 70, 80, 90, 100, 110, 120, 130, 140, 150 LIGHTING DEVICE
2 BASE MATERIAL
2a FIRST SURFACE
3 LIGHTING PORTION
3D, 3E, 3F FOURTH SURFACE, FIFTH SURFACE, SIXTH SURFACE
(REFLECTING SURFACE)
4 VOID PORTION
L, L2 LIGHT
M, N ROTATING SHAFT
10 (10A, 10B, 10C), 31, 41, 61, 91, 111, 122, 132, 141 LIGHTING UNIT
11, 32, 43, 44 MOUNTING UNIT
12 LIGHTING SHEET
12C PERIPHERAL PORTION
13 FRAME (SUPPORTING MEMBER)
13C INNER WALL SURFACE
14, 74 GROOVE PORTION
14c BOTTOM SURFACE
21 COUPLING MEMBER
33 ROTATION MECHANISM
53a INCLINED SURFACE
63A, 64A OPENING PORTION (LIGHT TRANSMITTING PORTION)
81 TEMPERATURE DETECTING MEMBER (MEMBER FOR MANAGING TEMPERATURE)
109 WINDOW FRAME (MOUNTING TARGET)
1003b, 1003d WALL

The invention claimed is:
1. A lighting device comprising:
at least one lighting unit; and
at least one mounting unit that mounts the at least one lighting unit on a mounting target, wherein
the at least one lighting unit includes:
a lighting sheet; and
a supporting member supporting the lighting sheet, in a flat state, in at least a portion of a peripheral portion of the lighting sheet, the supporting member including at least one first attachment portion, the at least one first attachment portion is only provided at an upper portion of the supporting member, the at least one mounting unit includes at least one attaching member including at least one second attachment portion and at least one third attachment portion, the at least one second attachment portion being fixed to the at least one first attachment portion, and the at least one third attachment portion being fixed to the mounting target, the lighting sheet includes:
 a base material having optical transparency,
 a plurality of lighting portions having optical transparency which are provided in a first surface of the base material, and
 a void portion which is provided between the plurality of lighting portions, and
a portion of a side surface of the plurality of lighting portions facing the void portion serves as a reflecting surface reflecting light which is incident to the plurality of lighting portions.

2. The lighting device according to claim 1, wherein
the supporting member is defined by a frame body, and
the frame body supports the lighting sheet such that the frame body surrounds the peripheral portion of the lighting sheet.

3. The lighting device according to claim 2, wherein the frame body includes a groove portion in an inner wall surface in which the lighting sheet is disposed and supports the lighting sheet by inserting the peripheral portion of the lighting sheet into the groove portion.

4. The lighting device according to claim 3, wherein a gap is provided between a bottom surface of the groove portion and the lighting sheet.

5. The lighting device according to claim 2, wherein
the at least one attaching member includes a plurality of attaching members, and
the plurality of attaching members are provided at one side of the frame body.

6. The lighting device according to claim 1, wherein
the at least one lighting unit includes a plurality of lighting units, and
a coupling member coupling the plurality of lighting units is provided in the supporting member.

7. The lighting device according to claim 1, wherein an inclined surface which is inclined to an incident direction side of light with respect to a main surface of the lighting sheet in a normal direction is provided in a portion of the supporting member.

8. The lighting device according to claim 1, wherein a light transmitting portion is provided in a portion of the supporting member.

9. The lighting device according to claim 1, further comprising:
a rotation mechanism which rotates the at least one lighting unit around a rotating shaft which is parallel to a main surface of the lighting sheet.

10. The lighting device according to claim 9, wherein
the at least one mounting unit includes a plurality of mounting units which are arranged in one direction, and
the rotation mechanism rotates the at least one lighting unit around a rotating shaft extending in a direction parallel to an arrangement direction of the plurality of mounting units.

11. The lighting device according to claim 9, wherein
the at least one mounting unit includes a plurality of mounting units which are arranged in one direction,
the plurality of mounting units are detachable from the at least one lighting unit, and
the rotation mechanism rotates the at least one lighting unit around a rotating shaft extending in a direction parallel to an arrangement direction of the plurality of mounting units.

12. The lighting device according to claim 1, wherein an elastic body is provided in at least a portion of the supporting member.

13. The lighting device according to claim 1, wherein the supporting member is expandable in a direction along an outer periphery of the lighting sheet.

14. The lighting device according to claim 1, wherein a member for managing a temperature is provided in the at least one lighting unit.

15. The lighting device according to claim 1, wherein the at least one mounting unit is detachable from the at least one lighting unit.

16. The lighting device according to claim 15, wherein the at least one mounting unit is fixed to the at least one lighting unit by using a screw.

17. The lighting device according to claim 1, wherein the mounting target is a window frame.

* * * * *